(12) United States Patent
Miki et al.

(10) Patent No.: US 7,746,904 B2
(45) Date of Patent: Jun. 29, 2010

(54) AUDIO/VIDEO PROCESSING UNIT AND CONTROL METHOD THEREOF

(75) Inventors: Hirosuke Miki, Tenri (JP); Yoshihiro Ohtani, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 757 days.

(21) Appl. No.: 11/594,117

(22) Filed: Nov. 8, 2006

(65) Prior Publication Data

US 2007/0110110 A1 May 17, 2007

(30) Foreign Application Priority Data

Nov. 11, 2005 (JP) ............... 2005-327991
Aug. 24, 2006 (JP) ............... 2006-228386

(51) Int. Cl.
*H04J 3/06* (2006.01)
(52) U.S. Cl. .................. 370/487; 370/503; 370/535
(58) Field of Classification Search .............. None
See application file for complete search history.

(56) References Cited

U.S. PATENT DOCUMENTS

| | | | | |
|---|---|---|---|---|
| 6,330,022 | B1 * | 12/2001 | Seligmann | 348/14.08 |
| 2002/0126703 | A1 * | 9/2002 | Kovacevic | 370/487 |
| 2003/0079035 | A1 | 4/2003 | Boyd et al. | |
| 2004/0250273 | A1 * | 12/2004 | Swix et al. | 725/25 |
| 2005/0076092 | A1 * | 4/2005 | Chang et al. | 709/217 |
| 2006/0159280 | A1 * | 7/2006 | Iwamura | 381/79 |
| 2006/0197880 | A1 * | 9/2006 | Tomonaga et al. | 348/729 |
| 2006/0294569 | A1 * | 12/2006 | Chung | 725/133 |
| 2007/0140298 | A1 * | 6/2007 | Eng | 370/485 |
| 2008/0109574 | A1 * | 5/2008 | Holmes | 710/29 |

FOREIGN PATENT DOCUMENTS

| | | |
|---|---|---|
| JP | 2003-259240 A | 9/2003 |
| JP | 2004-282667 A | 10/2004 |
| JP | 2004-320653 A | 11/2004 |

OTHER PUBLICATIONS

Steinmetz et al., IEEE Journal on Selected Areas in Communications, Jan. 1996, pp. 61-72, vol. 14, No. 1.

* cited by examiner

*Primary Examiner*—Min Jung
(74) *Attorney, Agent, or Firm*—Birch, Stewart, Kolasch & Birch, LLP

(57) ABSTRACT

A home theater includes a main unit section and at least one speaker section. The main unit section includes a communication section which receives an AV stream from an AV stream transmission device and via a communication network, a demux section which separates the AV stream into a video stream and an audio stream, a video processing means which processes the video stream so as to generate a video signal, an audio processing section which processes the audio stream so as to generate an audio signal, and an audio acquisition section which acquires an audio stream which includes at least a part of the audio of the AV stream. The communication section transmits the audio stream acquired by the audio acquisition section to the speaker section, via the communication network.

25 Claims, 9 Drawing Sheets

AUDIO/VIDEO PROCESSING UNIT AND CONTROL METHOD THEREOF

This Nonprovisional application claims priority under 35 U.S.C. §119(a) on Patent Application No. 327991/2005 filed in Japan on Nov. 11, 2005 and Patent Application No. 228386/2006 filed in Japan on Aug. 24, 2006, the entire contents of which are hereby incorporated by reference.

FIELD OF THE INVENTION

The present invention relates to an audio/video processing main unit which performs audio and video processes and a control method thereof, an audio processing terminal device which performs audio processes and a control method thereof, an audio processing main unit which performs audio processes, an audio/video processing system, an audio/video processing main unit control program, an audio processing terminal device control program, and a storage medium storing the program.

More specifically, the present invention relates to a home theater system including a home theater main unit and one or more speaker.

BACKGROUND OF THE INVENTION

A most typical home theater is arranged in such a manner that a home theater main unit is connected with a display and speakers, using lines which are not designed for constructing a network. Since the main unit is connected to the speakers using analog-audio transmission lines, many lines and a complicated arrangement thereof are required. In particular, in case where the home theater main unit is placed in front of the user, the distance between the home theater main unit and a speaker (rear speaker) behind the user is long. A long line connecting these devices is troublesome in circumstances such as home.

To solve this problem, all or some speakers form a network based on a wireless/wired network technology, and audio signals are exchanged over the network. In the case of a wired network in which a home theater main unit and speakers are connected with one another by transmission lines for network use, the arrangement of the lines can be made simpler than a case where the home theater main unit is connected to the speakers using transmission lines for analog sound.

For example, a home theater adopting a 5.1 channel audio system requires at least 6 speakers. When a network is not constructed, at least six transmission lines for analog sound are provided between the home theater unit and the speakers. On the other hand, when a wired network such as LAN (Local Area Network) is constructed, an existing network is available. Therefore each of the home theater main unit and the speakers has only one transmission line for the network, which is connected to each port of the network.

In case where audio signals are transmitted over a network, analog audio signals may be modulated by FM (Frequency Modulation) or AM (Amplitude Modulation). However, analog signals may be deteriorated after being simply modulated.

In case where an audio signal is digitized before the transmission, the transmission of the signal can be conducted through a wireless communication medium such as infrared light and radio wave (see Japanese Laid-Open Patent Application No. 2004-320653; published on Nov. 11, 2004, for example). However, in the case of infrared light, transmission cannot be carried out when an obstacle such as a passer exists between a transmitter and a receiver. The efficiency of transmission between AV (Audio/video) devices is deteriorated in this case.

Standards such as Bluetooth® use a 2.4 Ghz bandwidth which is also used by microwave ovens. For this reason, audio signals may not be properly transmitted by Bluetooth®, when a microwave oven is in operation. The quality of sound, i.e. the quality of transmission between AV devices is therefore deteriorated. Considering the quality, infrared and 2.4 Ghz transmissions should be avoided in case of real-time transmission of video and audio.

The above-described case relates to simplification of an arrangement of lines in a home theater, by transmitting only audio signals on a network. On the other hand, with the growing popularity of the Internet, content on websites can be played on information communication terminals PCs, PDAs (Personal Digital Assistants), and mobile phones, which are remote from the websites.

It is also expected to enable home electric appliances to play content on websites on the Internet. In doing so, it is important to assure interoperability between appliances of different manufacturers. An example of a standard for achieving this interoperability is DLNA (Digital Living Network Alliance).

FIG. 8 shows a case where an AV signal is supplied from an AV source device to a television receiver (hereinafter, television), based on DLNA. In the case shown in the figure, the AV source device 1001 and the television 1002 both of which are compliant with DLNA can be connected with each other without any problems, even if these devices are the products of different manufacturers. To expand the versatility of the AV source device 1001, it is preferable to allow not only the television 1002 but also a home theater to receive a DLNA-compliant AV signal from the AV source device 1001.

The AV source device 1001 is constituted by a video player such as a DVD (Digital Versatile Disk)/Blu-ray Disc player, a DVD/Blu-ray disc recorder, and an HDD (Hard Disk Drive) recorder, or a broadcast receiver such as a BS (Broadcasting Satellite)/CS (Communications Satellite) tuner.

As described above, it is important to allow a home theater to play content on a network, and in doing so, it is required to transmit not only audio signals but also video signals over the network.

In the meantime, lip synchronization is required for playing video and audio content. The lip synchronization means to synchronize the moving images on a television with the sound from a speaker. When out-of-synch for lip synchronization is considerable, synchronization between audio and video is not maintained. According to Non-Patent Document 1 (R. Steinmetz, "Human Perception of Jitter and Media Synchronization", IEEE Journal On Selected Areas In Communications, Vol. 14, No. 1, pp. 61-72, January 1996), the maximum permissible skew for lip synchronization is about 5 ms. In other words, a skew not shorter than 5 ms is perceptible for human eyes. On this account, AV devices are required to take account of lip synchronization.

In case where audio signals and video signals are transmitted over a network, a further delay occurs during the transmission over the network. It is therefore necessary to compensate a delay due to network transmission, in order to design a high-quality AV device connectable to a network.

Also according to Non-Patent Document 1, stereophonic sound requires the skew between sounds from the both speakers to fall within the range of ±11 µs. In case where respective speakers independently use communication devices, the skew among these communication devices must fall within the range of ±11 µs. As Non-Patent Document 1 defines that a skew for stereophonic sound must fall within the range of ±11 µs, skews of sounds among the speakers must also fall within the range of ±11 µs.

Patent Document 2 (Japanese Laid-Open Patent Application No. 2004-282667; published on Oct. 7, 2004) proposes a transmission device for transmitting audio signals and video signals over a network, and this transmission device has lip synchronization capability. The transmission device includes a wireless transmitter, an audio receiver (e.g. speaker), and a video receiver (e.g. television). The wireless transmitter is directly connected to the output of a typical AV device. Audio signals and video signals from the AV device are supplied to an audio signal encoding section and a video signal encoding section of the wireless transmitter, respectively, and subjected to different processes. The audio signals and video signals are then supplied to the audio receiver and the video receiver, respectively.

However, data streams of, for example, MPEG2 typically include both audio and video data. Therefore, DLNA-compliant transmitters and receivers which are currently under development are designed with the assumption that MPEG2 streams include both audio and video data. According to the architecture proposed by Patent Document 2, even if audio signals and video signals are DLNA-compliant, these types of signals are transmitted by different streams. For this reason, the architecture of Patent Document 2 is not directly interoperable with typical network AV devices (hereinafter, AV stream source devices) which transmit audio and video data by the same stream.

The architecture of Patent Document 2 can be indirectly interoperable with the AV stream source devices, because the architecture is connectable with an external AV device. The interoperability is achieved when the input of the AV device connected to the architecture is interoperable with the AV stream source devices. In this case, the AV device receives, from an AV stream source device, a stream including both audio and video data, separates the audio data from the video data, and outputs the audio data and the video data to the architecture, in a separated manner.

In this case, the audio data and video data are supplied from the AV device to the architecture of Patent Document 2, and then the architecture supplies the audio data and the video data to the audio receiver and the video receiver, respectively. Since the audio data and the video data are transmitted twice, bandwidth efficiency is deteriorated.

For example, in the case of MPEG2 in compliance with HDTV (High Definition Television), the transmission rate of a data stream is at least 20 Mbps. In case where the architecture of Patent Document 2 does not convert the transmission rate of the supplied data stream, two transmissions require at least 40 Mbps. As to wireless transmission, transmission at the transmission rate of not less than 40 Mbps is impossible, because the performance on the MAC-SAP (Media Access Control Service Access Point) of a WLAN (Wireless LAN) module compliant with current IEEE (The Institute of Electrical and Electronics Engineers) 802.11a is 35 Mpbs at the maximum.

IEEE802.11n, which is a currently-developed next-generation wireless LAN standard, is expected to achieve the transmission rate of 100 Mbps or higher on the MAC-SAP. However, this rate is achieved only at short range, and the overall transmission rate in the case of, for example, a home network is assumed to be not higher than 50 Mbps. The above-described transmission rate of 40 Mbps is barely achievable in this case, but significantly heavy load on the transmission path influences on other data transmissions.

For example, IEEE802.11n is expected to support plural HDTV transmissions. When the bandwidth for two transmissions are required for one transmission for HDTV, plural HDTV transmissions cannot be achieved. Also, a home network is expected to be used not only for video data transmission but also for e-mail, Internet browsing, telephone using VoIP (Voice Over Internet Protocol), and Internet games. Since it is important to secure bandwidth for these uses, the quality of service is deteriorated, if bandwidth is inefficiently used.

In case where the transmission rate of a stream supplied to the architecture of Patent Document 2 is converted to a higher transmission rate, the above-described bandwidth problem grows worse. On the other hand, if the transmission rate of a stream supplied to the architecture is lowered, the qualities of transmitted sound and images are deteriorated.

SUMMARY OF THE INVENTION

The present invention was done to solve the problem above. The objective of the present invention is to provide an audio/video processing main unit, an audio processing terminal device or the like, which can improve the bandwidth efficiency.

To achieve this objective, an audio/video processing main unit of the present invention, which conducts audio processing and video processing, includes: receiving means for receiving an AV stream including video and audio, from an external device via a communication network; demux means for separating the AV stream into a video stream including the video and an audio stream including the audio; video processing means for processing the video stream so as to generate a video signal; audio acquisition means for acquiring an audio stream including at least a part of the audio, from the AV stream supplied to the receiving means; and transmitting means for transmitting the audio stream acquired by the audio acquisition means, to at least one external device via the communication network.

In the present invention, the term "audio" denotes voices as well as various sounds such as music and acoustics. An example of the external device transmitting an AV stream including audio and video is a server for AV streams. Examples of the external device which receives an audio stream supplied from the audio/video processing main unit are a communication device for a speaker and a network-compatible speaker.

According to the arrangement above, an AV stream including video and audio is supplied, the supplied AV stream is separated into a video stream and an audio stream, and the separated video stream is processed so that a video signal is generated. Also, an audio stream including at least a part of the audio in the supplied AV stream is acquired and supplied to at least one external device.

In case where the device of the present invention arranged as above is used in an audio/video processing system such as a home theater, it is possible to achieve direct interoperability with typical network AV devices transmitting AV streams, and improve the bandwidth efficiency by reducing the number of transmissions of video and audio as compared to conventional arrangements.

Also according to the arrangement above, an audio stream acquired by the audio acquisition means can be transmitted, by the transmitting means, to at least one external device via the communication network. It is therefore possible to flexibly change the configuration and arrangement of the audio/video processing main unit and external devices.

To achieve the objective above, an audio processing main unit of the present invention, which conducts audio processing and transmits an audio stream, includes: obtaining means for acquiring an audio stream including at least audio; audio processing means for subjecting the acquired audio stream to the audio processing, so as to output an audio signal; audio acquisition means for acquiring, from the acquired audio stream, an audio stream including at least a part of the audio; audio clock means for indicating a time for determining a timing to output the audio; adjusting means for adjusting the audio clock means in such a manner as to cause the audio clock means to be in synchronization with the audio stream acquired by the audio acquisition means; sampling means for sampling the time indicated by the audio clock means; and transmitting means for transmitting the audio stream acquired by the audio acquisition means and information of the time sampled by the sampling means, to at least one external device via a communication network.

According to the arrangement above, an audio stream including at least audio is acquired and an audio signal is generated by processing the acquired audio stream, whereas an audio stream acquired by the audio acquisition means is supplied, by the transmitting means, to at least one external device via the communication network. Therefore, as with the case above, it is possible to flexibly change the configuration and arrangement of the audio processing main unit and the external devices.

Also, since the audio clock means is in synchronization with the acquired audio stream, it is possible to meet the requirement for the skews of sounds among the audio processing main unit and the external devices.

Moreover, the time indicated by the audio clock means is sampled and the information about the sampled time is supplied to at least one external device. The audio clock means by which the time to output audio to the external devices is determined is adjusted in accordance with the sampled time. On this account, the synchronization with the audio clock means of the audio processing main unit is precisely done. As a result, the precision of the synchronization is higher than the requirement.

To achieve the objective above, an audio processing terminal device of the present invention includes: receiving means for receiving an audio stream including audio, from an external device via a communication network; audio processing means for processing the audio stream so as to generate an audio signal; audio clock means for indicating a time for determining a timing to output the audio; and adjusting means for adjusting the audio clock means in such a manner as to cause the audio clock means to be in synchronization with the audio stream.

According to this arrangement, an audio stream including audio is supplied and an audio signal is generated by processing the supplied audio stream, whereas the timing to output the audio is determined using the audio clock means which is in synchronization with the supplied audio stream. With this arrangement, it is possible to meet the requirement for the skews of sounds among the external devices (audio/video processing main unit, audio processing main unit) and the audio processing terminal device. Also according to the arrangement above, it is possible to construct a network speaker which can be used in a network home theater compliant with AV streams supplied from typical network AV devices.

Effects similar to the above can be achieved by an audio/video processing system including the above-described audio/video processing main unit and the above-described audio processing terminal device which receives an audio stream from the audio/video processing main unit via a communication network To achieve the objective above, a control method of an audio/video processing main unit of the present invention, which conducts video processing and audio processing, includes the steps of: receiving an AV stream including video and audio, from an external device via a communication network; acquiring, from the supplied AV stream, an audio stream including at least a part of the audio; and transmitting the acquired audio stream to at least one external device, via the communication network.

According to the method above, an AV stream including video and audio is supplied, an audio stream including at least a part of the audio included in the supplied AV stream is acquired, and the acquired audio stream is supplied to at least one external device.

In case where the method of the present invention arranged as above is used in an audio/video processing system such as a home theater, it is possible to achieve direct interoperability with typical network AV devices transmitting AV streams, and improve the bandwidth efficiency by reducing the number of transmissions of video and audio as compared to conventional arrangements. Furthermore, since the acquired audio stream is supplied to at least one external device via a communication network, it is possible to flexibly change the configuration and arrangement of the audio/video processing main unit and the external devices.

To achieve the objective above, a control method of an audio processing terminal device of the present invention, which conducts audio processing and includes audio clock means for indicating a time for determining a timing to output audio, includes the steps of: receiving an audio stream including the audio, from an external device via a communication network; adjusting the audio clock means in such a manner as to cause the audio clock means to be in synchronization with the audio stream; and processing the audio stream in reference to the time indicated by the adjusted audio clock means, so as to generate an audio signal.

According to the arrangement above, an audio stream including audio is supplied and an audio signal is generated by processing the supplied audio stream, whereas the timing to output the audio is determined using the audio clock means which is in synchronization with the supplied audio stream. This makes it possible to meet the requirement for the skews of sounds among the external devices (audio/video processing main unit, audio processing main unit) and the audio processing terminal device.

The means of the above-described audio/video processing main unit can be realized on a computer by an audio/video processing main unit control program. Also, the means of the above-described audio processing terminal device can be realized on a computer by an audio processing terminal device control program.

The audio/video processing main unit control program and/or the audio processing terminal device control program is stored in a computer-readable storage medium. This makes it possible to execute the audio/video processing main unit control program and/or the audio processing terminal device control program on any computers.

As described above, the audio/video processing main unit of the present invention receives an AV stream including video and audio, acquires an audio stream including at least a part of the audio from the supplied AV stream, and transmits the acquired audio stream to at least one external device. This makes it possible to achieve direct interoperability with typical network AV devices transmitting AV streams, and improve the bandwidth efficiency by reducing the number of transmissions of video and audio as compared to conventional arrangements.

Additional objects, features, and strengths of the present invention will be made clear by the description below. Further, the advantages of the present invention will be evident from the following explanation in reference to the drawings.

DESCRIPTION OF THE EMBODIMENTS

Embodiment 1

Figure 1:
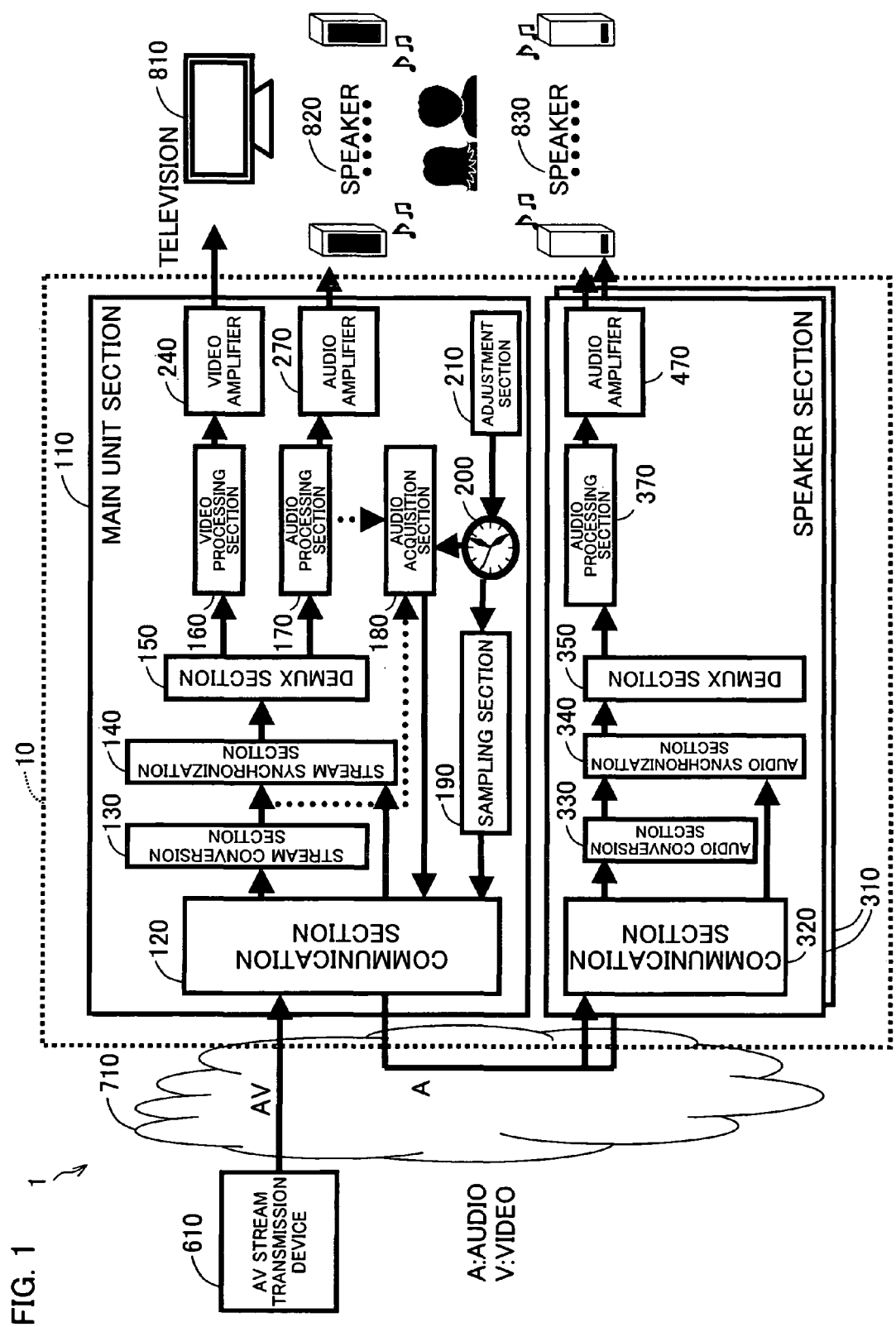
FIG. 1 is a block diagram which outlines an AV stream transmission system of an embodiment of the present invention.
Figure 2:
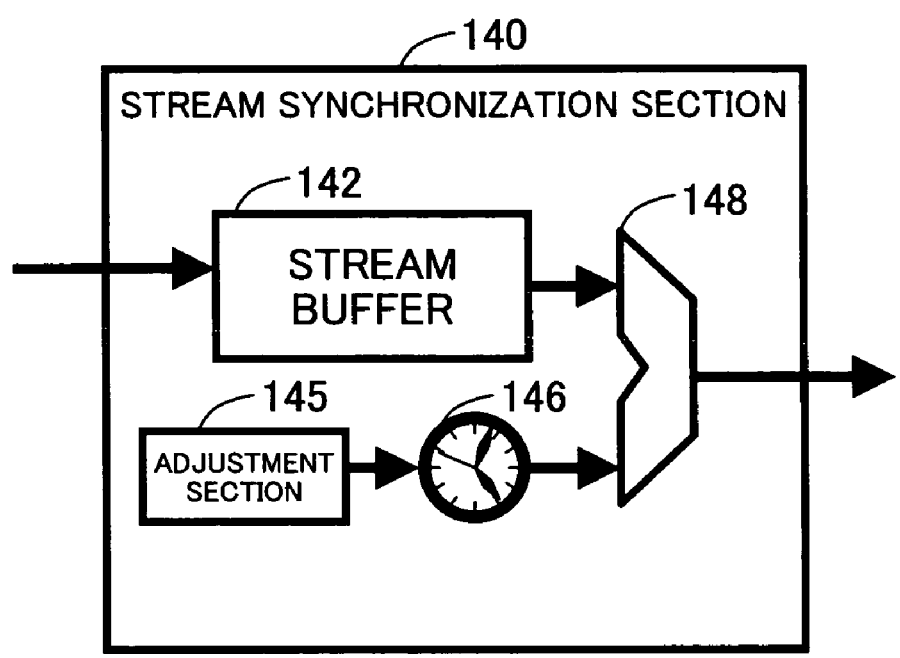
FIG. 2 is a block diagram which outlines a stream synchronization section of a main unit section of the AV stream transmission system.
Figure 3:
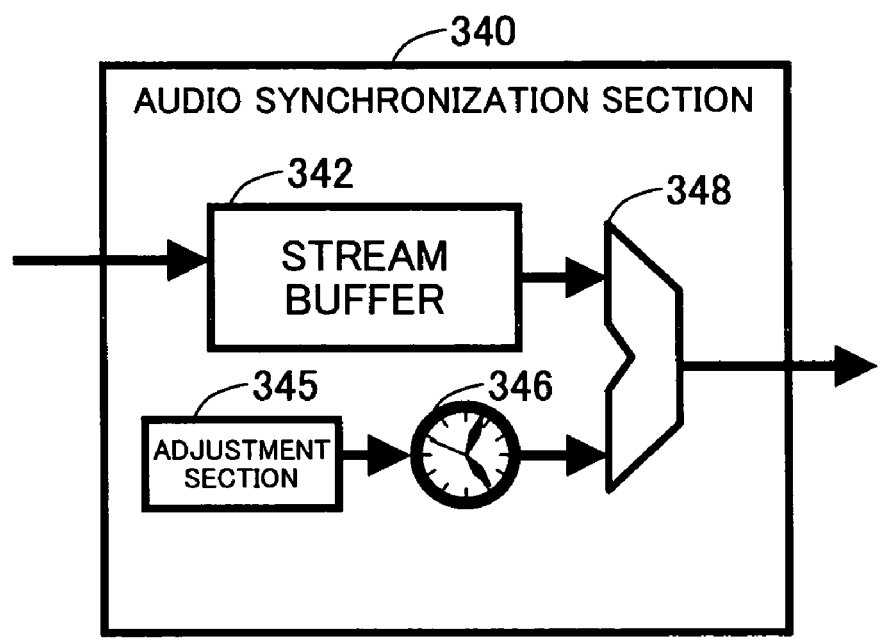
FIG. 3 is a block diagram which outlines an audio synchronization section of a speaker section of the AV stream transmission system.

The following will describe an embodiment of the present invention in reference to FIGS. 1-3. FIG. 1 outlines an AV stream transmission system of the present embodiment. As shown in the figure, an AV stream transmission system 1 is arranged such that an AV stream transmission device (external device) 610 and a home theater (audio/video processing system) 10 can communicate with each other via a network 710.

The AV stream transmission device 610 transmits AV streams. Examples of the AV stream transmission device 610 include an AV server, a network-compatible DVD/HDD/CD player, and a tuner.

An AV stream is supplied from the AV stream transmission device 610 to the home theater 10, via the network 710. The AV stream from the AV stream transmission device 610 can be supplied not only to the home theater 10 but also to a typical television receiver with network capability.

The AV stream may be based on an AV format such as MPEG2-TS (Transport Stream), MPEG2-PS (Program Stream), MPEG4, H.324, H.264, and WMV (Windows Media® Video).

Examples of the network 710 may include the Internet, LAN, mobile communication network, and satellite communication network.

As shown in FIG. 1, the home theater 10 includes a main unit section (audio/video processing main unit, audio processing main unit) 110 and a speaker section (audio processing terminal device) 310. The main unit section 110 includes a communication section (receiving means, transmitting means, and obtaining means) 120, a stream conversion section 130, a stream synchronization section 140, a demux section (demux means) 150, a video processing section (video processing means) 160, an audio processing section (audio processing means) 170, an audio acquisition section (audio acquisition means) 180, a sampling section (sampling means, acquisition sampling means) 190, an audio clock section (audio clock means) 200, an adjustment section (adjusting means) 210, a video amplifier 240, and an audio amplifier 270.

The communication section 120 of the main unit section 110 receives an AV stream from the AV stream transmission device 610 over the network 710, and sends the supplied AV stream to the stream conversion section 130. The stream conversion section 130 converts the format of the supplied AV stream into a format with which the stream can be processed by the video processing section 160 and the audio processing 170 of the main unit section 110. The stream conversion section 130 then supplies the converted AV stream to the stream synchronization section 140. For example, in case where the video processing section 160 and the audio processing section 170 are compliant with MPEG2-PS while the supplied AV stream is based on MPEG4, the stream conversion section 130 converts the MPEG4 format into the MPEG2-PS format.

In case where the video processing section 160 and the audio processing section 170 are compliant with the format of the AV stream supplied from the AV stream transmission device 610, the stream conversion section 130 is unnecessary. In this case, the AV stream is supplied from the communication section 120 to the stream synchronization section 140.

The stream synchronization section 140 is used in case where the AV stream includes a stream output time (TS time stamp) which indicates when the AV stream is supplied to the AV processing sections (video processing section 160 and the audio processing section 170), e.g. in case where the AV stream supplied to the stream synchronization section 140 is compliant with MPEG2-TS.

The process carried out by the stream synchronization section 140 is identical with the process for a TS time stamp in MPEG2-TS. For this reason, MPEG2-TS will be discussed first, before details of the stream synchronization section 140 are given.

Figure 7:
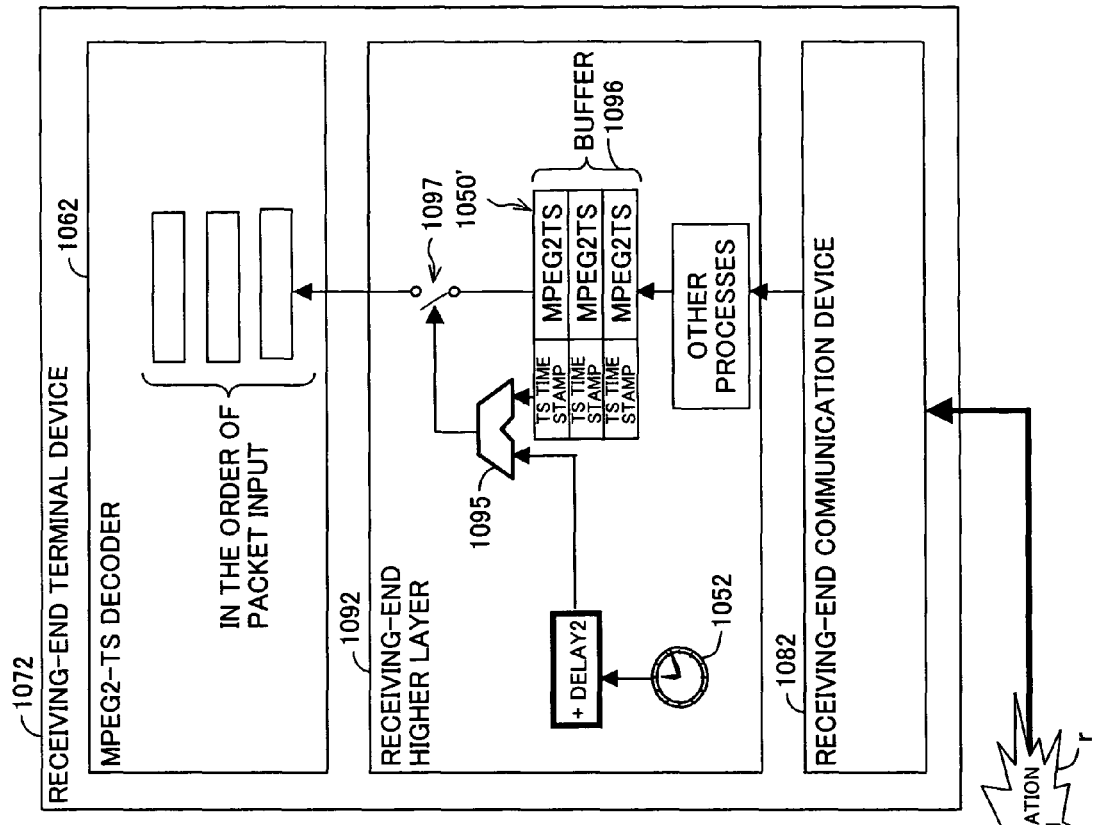
FIG. 7 is a block diagram illustrating the flow of data transmission of an MPEG2-TS stream from a transmitting-end terminal device to a receiving-end terminal device.
Figure 7:
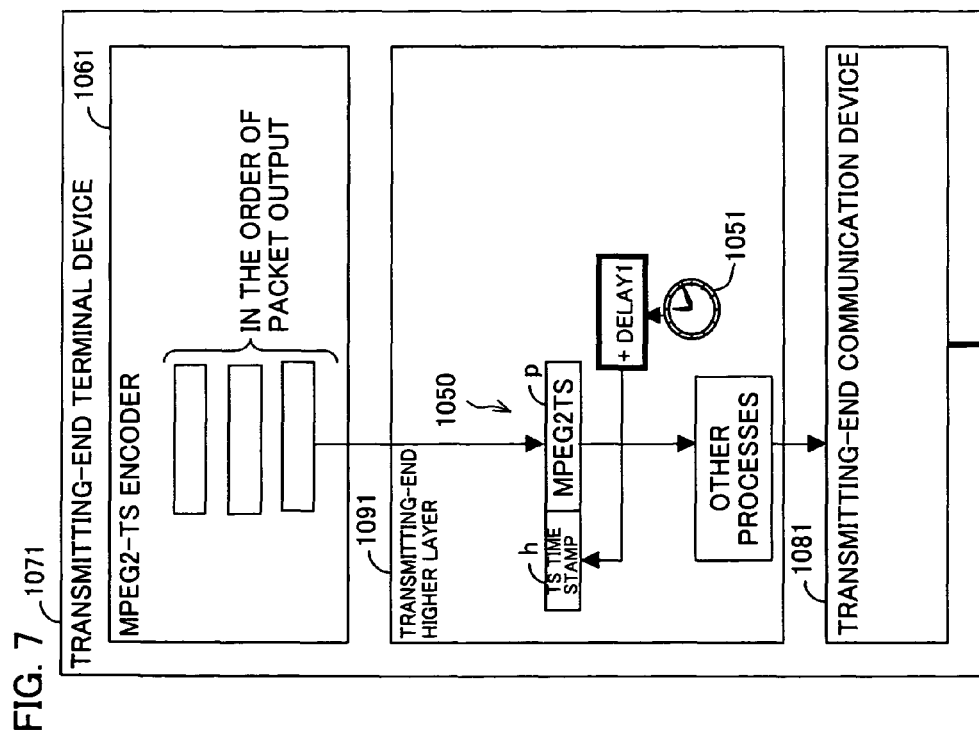
Figure 8:
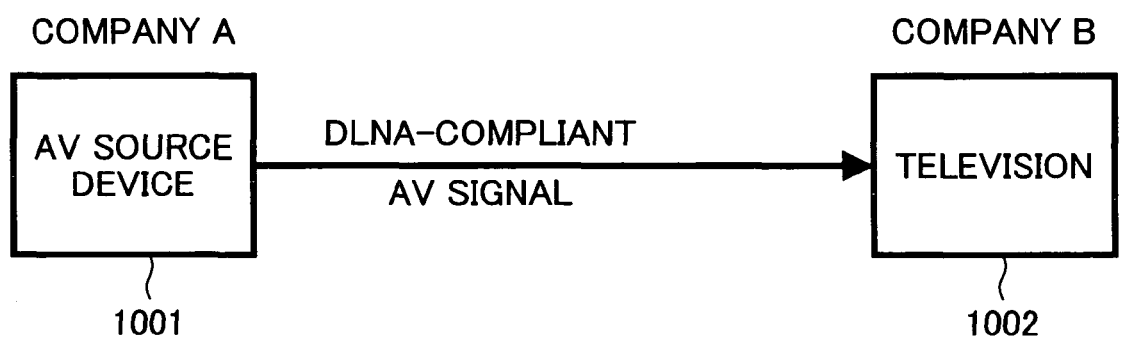
FIG. 8 is a block diagram illustrating an example where an AV signal is supplied from an Av source device to a television, based on DLNA.

MPEG2-TS is an AV stream format for transmitting transport-stream MPEG2 data over the Internet. FIG. 7 shows the flow of data transmission of an MPEG2-TS stream from a transmitting-end terminal device to a receiving-end terminal device. The transmitting-end terminal device 1071 includes an MPEG2-TS encoder (hereinafter, encoder) 1061, a transmitting-end higher layer 1091, and a transmitting-end communication section 1081. The receiving-end terminal device 1072 includes an MPEG2-TS decoder (hereinafter, decoder) 1062, a receiving-end higher layer 1092, and a receiving-end communication section 1082.

The encoder 1061 divides an AV stream into packets each of which is 188 bytes, and sends the packets to the transmitting-end higher layer. The packets are processed in the transmitting-end higher layer 1091 and the transmitting-end communication section 1081, and are supplied to the receiving-end terminal device 1072 via a communication path r.

In the receiving-end terminal device 1072, the packets supplied from the transmitting-end terminal device 1071 are processed in the receiving-end communication section 1082 and the receiving-end higher layer 1092 in this order. The packets supplied from the receiving-end higher layer 1092 are identical with those 188-byte packets supplied from the encoder 1061. The decoder 1062 receives the packets from the receiving-end higher layer 1092, converts the supplied packets into an AV stream, and outputs the AV stream.

Figure 9:
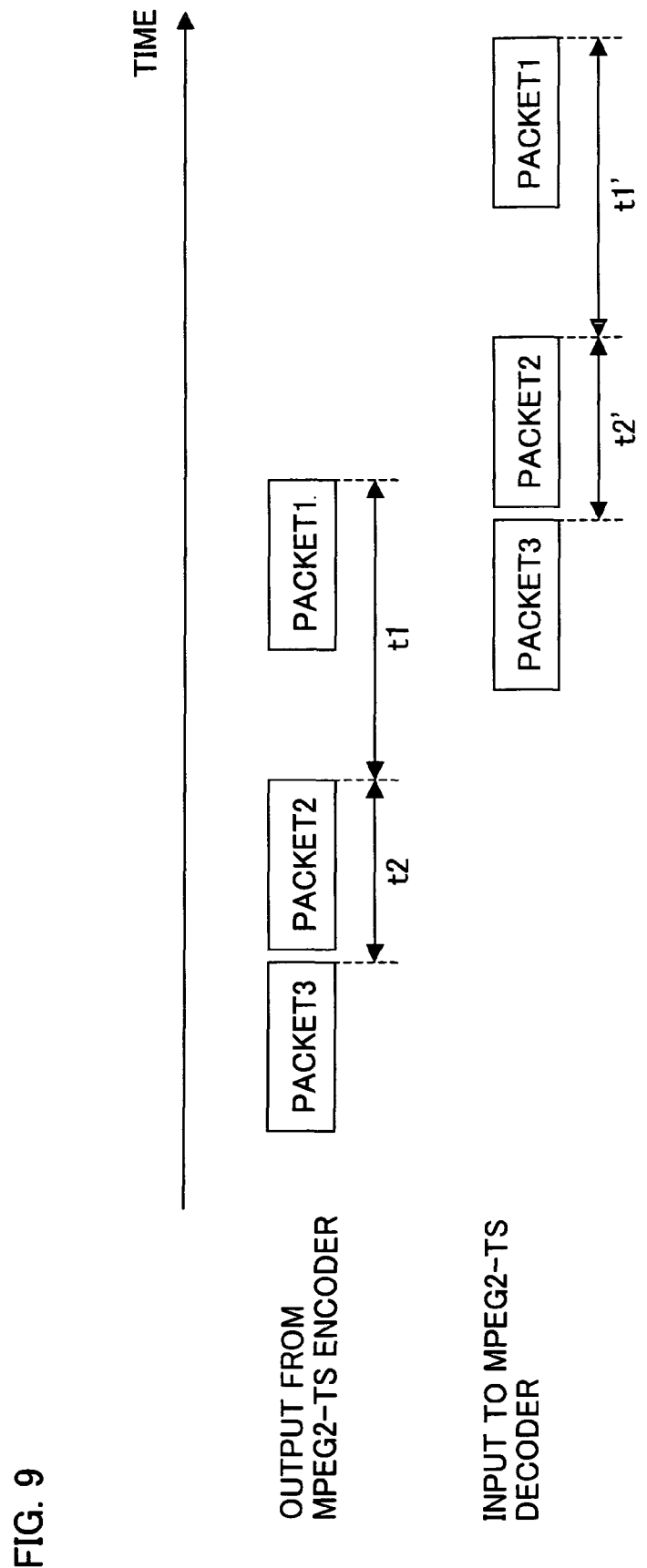
FIG. 9 is a time chart illustrating conditions for smoothly outputting images.

To smoothly output video, the interval between the packets supplied from the encoder 1061 is required to be identical with the interval between the packets supplied to the decoder 1062. FIG. 9 is a time chart showing this condition. As shown in the figure, provided that the time difference between packets 1 and 2 supplied from the encoder 1061 is t1, the time difference t1' between the packets 1 and 2 supplied to the decoder 1062 must be equal to t1. If t1' is not equal to t1, packets are not supplied to the decoder 1062 at right timings, and hence video is not smoothly outputted.

To satisfy the condition above, as shown in FIG. 7, the transmitting-end higher layer 1091 generates a packet 1050 in which a header h (4 bytes) including a time stamp for TS (i.e. TS time stamp) is added to a packet p (188 bytes) of MPEG2-TS. This generation of the packet 1050 is the first process conducted for the packets supplied from the encoder 1061.

Also, as shown in FIG. 7, the transmitting-end higher layer 1091 and the receiving-end higher layer 1092 have a transmitting-end clock 1051 and a receiving-end clock 1052, respectively. These clocks 1051 and 1052 are in sync with each other. The TS time stamp in the header h is arranged such that [time of input from the encoder 1061]+delay1 (which is a fixed value). The time of input from the encoder 1061 is generated by sampling the time indicated by the transmitting-end clock 1051. The packet 1050 generated by the transmitting-end higher layer 1091 is subjected to other processes in the transmitting-end higher layer 1091, and is then supplied from the transmitting-end communication device 1081 to the receiving-end terminal device 1072.

In the meanwhile, in the receiving-end terminal device 1072, the receiving-end communication section 82 receives the packets from the transmitting-end terminal device 1071, and the receiving-end higher layer 1092 performs other processes. As a result, a packet 1050' which is identical with the packet 1050 generated by the transmitting-end higher layer 1091 is restored. This packet 1050' is temporarily stored in a buffer 1096.

The receiving-end higher layer 1092 is required to output, to the decoder 1062, an MPEG-TS packet p in the packet 1050', at an appropriate timing. For that purpose, the TS time stamp in the packet 1050' is compared with a value determined by [time of the receiving-end clock 1052]+delay2 (which is a fixed value), by a comparator 1095. If the time stamp matches the value, a switch 1097 is turned on and the MPEG2-TS packet p in the packet 1050' is supplied to the decoder 1062. In this manner, adding the TS time stamp to the MPEG2-TS packet, it is possible to cause the interval of the packets supplied from the encoder 1061 to be identical with the interval of the packets supplied to the decoder 1062.

Examples of a standard using a TS time stamp for MPEG2-TS are DLNA and IEEE1394. In the case of DLNA, the transmitting-end clock 1051 is synchronized with a clock in a MPEG2 encoder. In the case of IEEE1394, the transmitting-end clock 1051 is synchronized with a clock of IEEE1394. In both cases, the transmitting-end clock 1051, the receiving-end clock 1052, and the MPEG2-TS stream are in sync with one another.

Details of the stream synchronization section 140 will be given. FIG. 2 outlines the stream synchronization section 140. As shown in the figure, the stream synchronization section 140 includes a stream buffer 142, an adjustment section (adjusting means) 145, a clock section (AV clock means) 146, and a comparison section (comparing means) 148. The clock section 146 corresponds to the receiving-end clock 1052 in FIG. 7.

First, an AV stream is stored in the stream buffer 142. At this point, the adjustment section 145 causes the clock section 146 to be synchronized with the AV stream. Examples of this adjustment by the adjustment section 145 are as follows: adjustment is carried out in reference to a remaining data amount in the stream buffer 142; adjustment is carried out in reference to a stream output time of the AV stream stored in the stream buffer 142; and adjustment is carried out in such a manner that the communication section 120 receives information for synchronization from an external AV stream transmission device 610. An example of a circuit used for the adjustment section 145 is PLL (Phase Locked Loop).

The comparison section 148 compares the stream output time of the AV stream with the time indicated by the clock section 146. If the stream output time is equal to or later than the time of the clock section 146, the AV stream is supplied to the demux section 150. This AV stream may not include the stream output time.

In case where, e.g. in MPEG2-PS, an AV stream supplied from the AV stream transmission device 610 does not include a stream output time, the AV stream supplied from the stream conversion section 130 or the communication section 120 may be directly sent to the demux section 150.

The demux section 150 separates video data from audio data in the AV stream, and supplies the video stream and the audio stream to the video processing section 160 and the audio processing section 170, respectively. The video processing section 160 decodes the supplied video stream, and supplies the decoded video signal to the video amplifier 240. The video amplifier 240 amplifies the supplied video signal and outputs the same to a television 810.

In the meanwhile, the audio processing section 170 decodes the supplied audio stream, and supplies the decoded audio signal to the audio amplifier 270. The audio amplifier 270 amplifies the supplied audio signal and outputs the same to a speaker 820. In the case of, for example, an MPEG2 stream, the demux section 150, the video processing section 160, and the audio processing section 170 are typically constructed in one semiconductor chip.

The audio acquisition section 180 acquires the audio stream from a particular section, during the processes from the communication section 120 to the voice processing section 170 and thereafter. The acquired audio stream is supplied to the speaker section 310, via the communication section 120 and the network 710.

The audio clock section 200 is caused to be in sync with the audio stream acquired by the audio acquisition section 180, by the adjustment section 210. An audio clock section 346 of the speaker section 310 is in sync with the audio clock section 200 of the main unit section 110. How the audio clock section 200 is adjusted will be discussed later.

In case where the acquired audio stream is MPEG2-compliant, the audio stream may include an adaptation field and a PSI (Program Specific Information) table of MPEG2.

The sampling section 190 is provided between the communication section 120 and the audio clock section 200, and samples the time of the audio clock section 200 (hereinafter, this time will be referred to as synchronizing time stamp). The sampled synchronizing time stamp is supplied to the speaker section 310, via the communication section 120 and the network 710. In case where the speaker section 310 does not need the synchronizing time stamp sampled by the sampling section 190, the sampling section 190 is unnecessary and it is needless to send the synchronizing time stamp to the speaker section 310.

There are two speaker sections 310 in the example shown in FIG. 1. However, the number of the speaker section 310 may be one or not less than three. A plurality of speaker sections 310 may receive audio signals of different channels, respectively.

The speaker section 310 includes a communication section (receiving means) 320, an audio conversion section 330, an audio synchronization section 340, a demux section 350, an audio processing section (audio processing means) 370, and an audio amplifier 470.

The communication section 320 of the speaker section 310 receives, via the network 710, an audio stream from the main unit section 110. The communication section 320 then supplies the audio stream to the audio conversion section 330. The audio conversion section 330 converts the format of the supplied audio stream into a format processable by the audio processing section 370 of the speaker section 310. The audio conversion section 330 then supplies the converted audio stream to the audio synchronization section 340. For example, in case where the audio processing section 370 is compliant with the AAC format while the supplied audio stream is compliant with the DTS format, the audio conversion section 330 converts the DTS format into the AAC format.

In case where the format of the audio stream supplied from the main unit section 110 is processable by the audio processing section 370, the audio conversion section 330 is unnecessary. In such a case, the audio stream is supplied from the communication section 320 to the audio synchronization section 340.

The audio synchronization section 340 is used in those instances where an audio stream includes a stream output time (TS time stamp) which indicates when the audio stream is supplied to the audio processing section 370, e.g. in case where an audio stream supplied to the audio synchronization section 340 has the MPEG2-TS format. The audio synchronization section 340 carries out a process identical with the aforesaid process for a TS time stamp in MPEG2-TS.

FIG. 3 outlines the audio synchronization section 340. As shown in the figure, the audio synchronization section 340 includes a stream buffer 342, an adjustment section (adjusting means) 345, an audio clock section (audio clock means) 346, and a comparison section (comparing means) 348.

First, an audio stream is stored in the stream buffer 342. At this moment, the adjustment section 345 causes the audio clock section 346 to be in sync with the audio stream, i.e. in sync with the clock section 146 of the main unit section 110. Examples of this adjustment by the adjustment section 345 are as follows: adjustment is carried out in reference to a remaining data amount in the stream buffer 342; adjustment is carried out in reference to a stream output time of the sound stream stored in the stream buffer 342; and adjustment is carried out using time information of a synchronizing time stamp supplied from the main unit section 110. An example of a circuit used for the adjustment section 145 is PLL.

The comparison section 348 compares the stream output time of the audio stream with the time indicated by the audio clock section 346. In case where the stream output time is equal to or later than the time indicated by the audio clock section 346, the audio stream is supplied to the demux section 350. This audio stream may not include a stream output time.

In case where, e.g. MPEG2-TS, an audio stream supplied from the main unit section 110 does not include a stream output time, the audio stream may be directly supplied to the demux section 350, from either the audio conversion section 330 or the communication section 320.

The demux section 350 supplies the audio stream to the audio processing section 370. The demux section 350, which is usually unnecessary, may be required when, for example, the audio processing section 370 is constituted by an MPEG2 semiconductor chip which can also perform typical image processing. The audio processing section 370 decodes the supplied audio stream, and sends the decoded audio signal to the audio amplifier 470. The audio amplifier 470 amplifies the supplied audio signal and sends the signal to the speaker 830.

The time of the audio clock section 200, which is sampled by the sampling section 190, may be multicasted or broadcasted from the main unit section 110 to the speaker section 310. Multicasting or broadcasting the time makes it possible to efficiently use the bandwidth.

Similarly, an audio stream may be multicasted or broadcasted from the main unit section 110 to the speaker section 310. Multicasting or broadcasting the audio stream makes it possible to efficiently use the bandwidth.

The time of the audio clock section 200, which is sampled by the sampling section 190, may be uni-casted from the main unit section 110 to the speaker section 310. The sampled time is surely transmitted by re-transmittable uni-casting.

Similarly, an audio stream may be uni-casted from the main unit section 110 to the speaker section 310. The audio stream is surely transmitted by re-transmittable uni-casting.

The main unit section 110 and the speaker section 310 may include cryptographic sections for decryption, in case where a supplied stream is encrypted for copyright protection. Such cryptographic sections are provided upstream of the video processing section 160 and the audio processing sections 170 and 370.

The main unit section 110 may include a cryptographic section for encryption of an audio stream supplied to the speaker section 310, for the sake of copyright protection. Such a cryptographic section is provided downstream of the audio acquisition section 180.

The communication means of the AV stream transmission device 610, the main unit section 110, and the speaker section 310 may support a wireless LAN (WLAN) standard such as IEEE802.11. In case where WLAN is adopted as a communication network, it is unnecessary to connect a home theater main unit with a network speaker by a wire, thereby making it possible to easily set up a home theater and simplify the wiring. WLAN with 5 Ghz bandwidth is advantageous in that problems involved with infrared and 2.4 Ghz do not occur.

The communication means of the AV stream transmission device 610, the main unit section 110, and the speaker section 310 may support PLC (Power Line Communication), for example. In case where PLC is adopted as a communication network, it is possible to connect a home theater main unit with a network speaker by an existing power line, thereby making it possible to easily set up a home theater and simplify the wiring.

Embodiment 2

Figure 4:
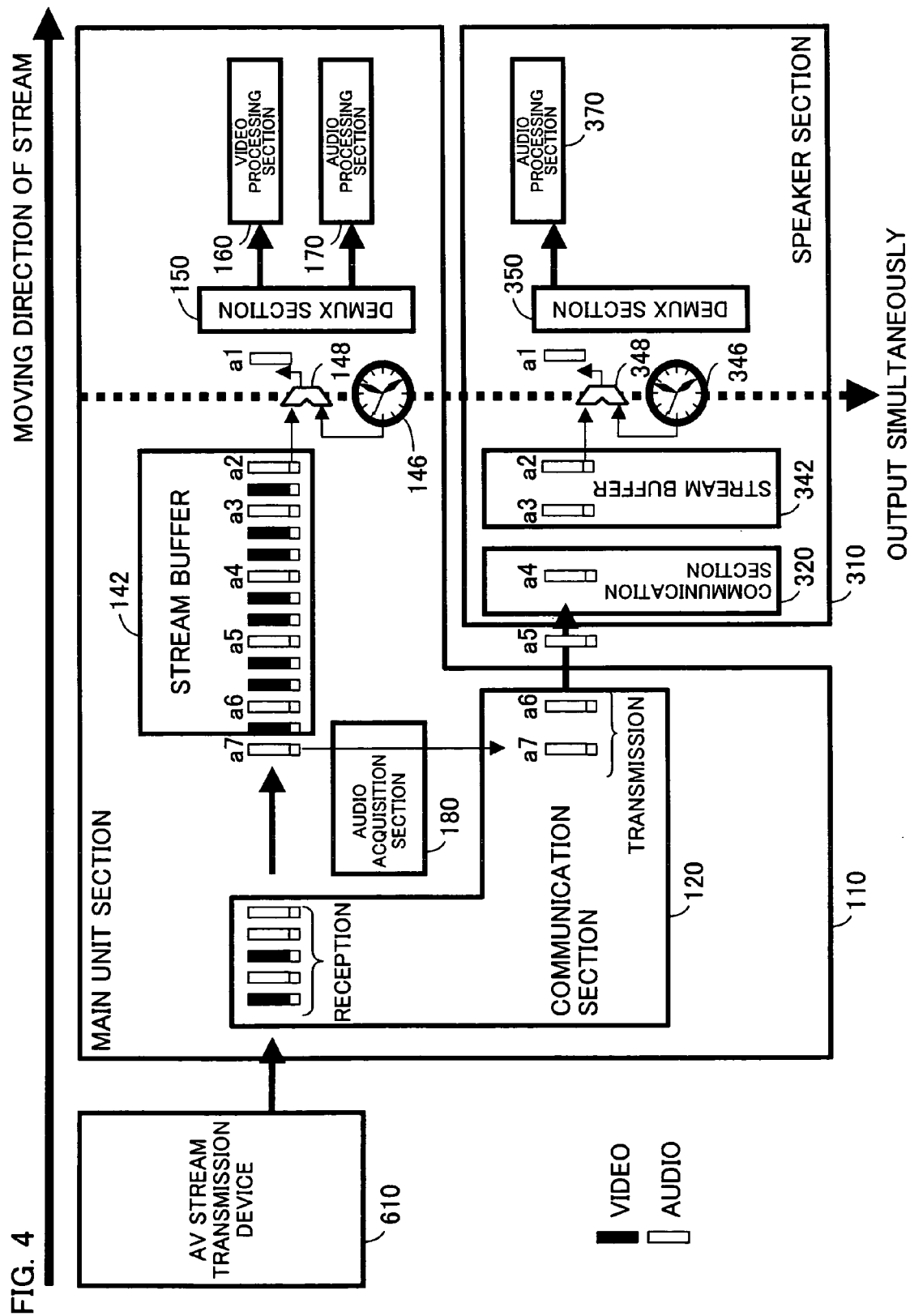
FIG. 4 is a block diagram which chronologically illustrates the flow of the AV stream supplied from an AV stream transmission device to a main unit section and a speaker section, in an AV stream transmission system of another embodiment of the present invention.

The following will describe another embodiment of the present invention in reference to FIG. 4. In the present embodiment, an audio acquisition section 180 acquires an audio stream from an AV stream before being supplied to a stream synchronization section 140. Also in the present embodiment, an AV stream includes a stream output time (TS time stamp) which indicates a time when the AV stream is supplied to an AV processing section (a video processing section 160 and an audio processing section 170), as in the case of MPEG2-TS, for example.

FIG. 4 chronologically shows the flow of an AV stream supplied from an AV stream transmission device 610 to a main unit section 110 and a speaker section 310, in the present embodiment. In the figure, the horizontal axis indicates time and the moving direction of the stream. Video and audio of the AV stream are represented by black boxes and white boxes, respectively. As compared to the arrangement in FIG. 1, the stream conversion section 130 and the audio conversion section 330 are omitted in the arrangement shown in FIG. 4. These sections, however, may be provided according to need.

In the present embodiment, first of all, a clock section 146 (see FIG. 2) also functions as an audio clock section 200, in the main unit section 110. Also, an adjustment section 145 also functions as an adjustment section 210. Furthermore, a clock section 146 of the main unit section 110 is in sync with a an audio clock section 346 (see FIG. 3) of the speaker section 330.

An AV stream is supplied from the AV stream transmission device 610 to a communication section 120 of the main unit section 110. After the processing by the communication section 120, the AV stream is supplied to a stream buffer 142 in a stream synchronization section 140, and an audio stream is acquired therefrom by an audio acquisition section 180. In the example shown in FIG. 4, an audio stream a7 is being inputted to the stream buffer 142, whereas the audio stream a7 is acquired in the audio acquisition section 180.

The audio stream acquired by the audio acquisition section 180 is supplied to the speaker section 310 by the communication section 120. The communication section 320 of the speaker section 310 receives the audio stream and transfers the stream to the stream buffer 342. Between the communication section 120 of the main unit section 110 and the communication section 320 of the speaker section 310, there are plural audio streams. In the example shown in FIG. 4, audio streams a4-a7 exist between the communication sections 120 and 320.

Therefore, the audio stream in the speaker section 310 is delayed as compared to the corresponding audio stream in the AV stream in the main unit section 110. The stream buffer 342 has a function to compensate this delay. Note that the delay occurs because, for example, the audio stream is transferred from the main unit section 110 to the speaker section 310. The stream buffer 142 of the main unit section 110 holds the corresponding AV stream until the transfer finishes.

Thereafter, in the main unit section 110, the comparison section 148 compares the stream output time of the AV stream in the stream buffer 142 with the time of the clock section 146. Simultaneously, in the speaker section 310, the comparison section 348 compares the stream output time of the audio stream in the stream buffer 342 with the time of the clock section 346. Since the clock sections 146 and 346 are in sync with one another, the audio streams of the main unit section 110 and the speaker section 310 are simultaneously supplied from the stream buffers 142 and 342 to the demux sections 150 and 350, respectively. In the example shown in FIG. 4, audio streams al are supplied from the stream buffers 142 and 342 to the demux sections 150 and 350.

In the main unit section 110, the AV stream is supplied to the video processing section 160 and the audio processing section 170, via the demux section 150. On the other hand, in the speaker section 310, the audio stream is supplied to the audio processing section 370, via the demux section 350.

As described above, in the main unit section 110 and the speaker section 310, the streams corresponding to one another are simultaneously subjected to audio processing. On this account, lip synchronization is easily achieved only by acquiring an audio stream from an AV stream before being inputted to the stream synchronization section 140.

In the speaker section 310, an inherent delay may occur after the processes in the comparison section 348 of the speaker section 310 and the comparison section 148 of the main unit section 110, because, for example, the demux section 350 is not used. In such a case, the delay is compensated by inputting an offset corresponding to an input (a time of the clock section or a stream output time) to either the comparison section 148 of the main unit section 110 or the comparison section 348 of the speaker section 310.

The present embodiment relates to an MPEG2-TS stream. To support MPEG2-PS by the method of the present embodiment, a stream conversion section 130 shown in FIG. 1 is additionally provided.

Embodiment 3

Figure 5:
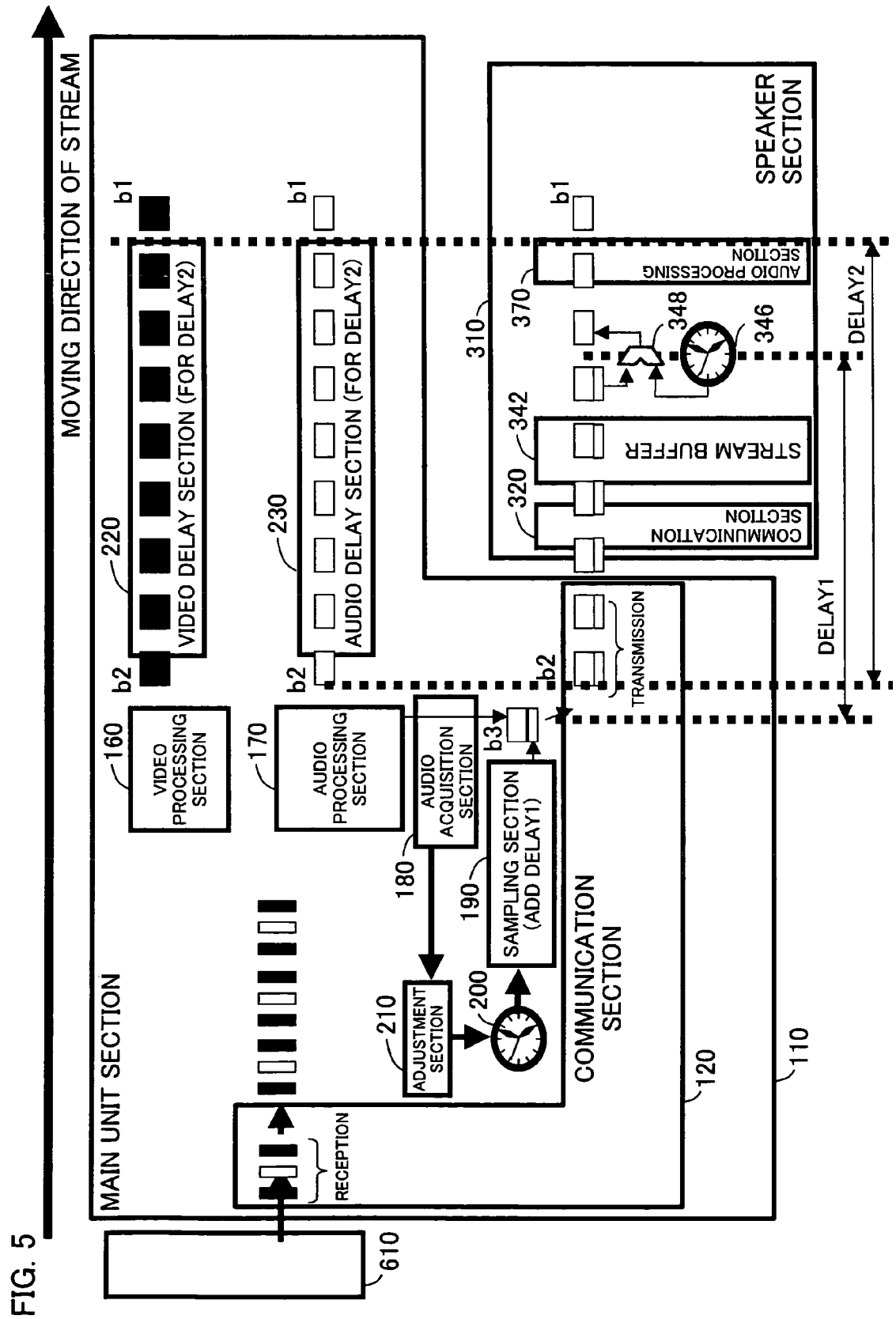
FIG. 5 is a block diagram which chronologically illustrates the flow of the AV stream supplied from an AV stream transmission device to a main unit section and a speaker section, in an AV stream transmission system of a further embodiment of the present invention.

The following will describe a further embodiment of the present invention in reference to FIG. 5. A home theater of the present embodiment is identical with the home theater 10 shown in FIG. 4, except that an audio acquisition section 180 acquires an audio stream from an audio processing section 170, while video supplied from a video processing section 160 is delayed. By the way, members having the same functions as those described in Embodiments above are given the same numbers, so that the descriptions are omitted for the sake of convenience.

FIG. 5 chronologically shows the flow of an AV stream which is transmitted from an AV stream transmission device 610 to a main unit section 110 and a speaker section 310. In the figure, the horizontal axis indicates time and the moving direction of the stream. Audio and video of the AV stream are represented by black boxes and white boxes, respectively. As compared to the arrangement in FIG. 1, the stream conversion section 130 and the audio conversion section 330 are omitted in the arrangement shown in FIG. 5. These sections, however, may be provided according to need.

As compared to the arrangement shown in FIG. 1, a video delay section (video delay means) 220 and an audio delay section (audio delay means) 230 are additionally provided in the present embodiment. In the present embodiment, a video processing section 160 and an audio processing section 170 are compliant with an optional AV stream format. However, in case where an AV stream includes a stream output time (TS time stamp) as in the case of an MPEG2-TS AV stream, a stream synchronization section 140 must be provided upstream of the video processing section 160 and the audio processing section 170. In such a case, a clock section 146 of the stream synchronization section 140 is preferably independent of an audio clock section 200. This is because the audio processing section 170 outputs an audio stream which is synchronized with a supplied AV stream with higher precision.

Higher precision is therefore achieved when a time of the audio clock section 200 is determined based on an acquired audio stream. On this account, the adjustment section 210 adjusts the audio clock section 200, based on the audio stream. For example, if an audio stream is compliant with S/PDIF format, S/PDIF data is accompanied with a predetermined synchronization header (Preamble) with a fixed length. It is possible to make a fine adjustment to the audio clock section 200 in reference to the synchronization header. In the meanwhile, the clock section 200 of the main unit section 110 is in sync with an audio clock section 346 of the speaker section 330.

An AV stream is supplied from the AV stream transmission device 610 to the communication section 120 of the main unit section 110. After the aforesaid processes, video and audio are supplied from the video processing section 160 and the audio processing section 170 to the video delay section 220 and the audio delay section 230, respectively.

On this occasion, the audio acquisition section 180 acquires either an audio stream as a result of the processing by the audio processing section 160 or an audio stream obtained during the processing by the audio processing section 160. An example of the audio stream as a result of the processing is a PCM (Pulse Code Modulation) signal which is completely decoded. An example of the audio stream obtained during the processing is a compressed S/PDIF signal.

Since it takes only a short time to output the compressed S/PDIF signal, the S/PDIF signal is outputted earlier than the corresponding PCM signal. Provided that an audio signal supplied to the audio delay section 230 shown in FIG. 5 is a PCM signal while a signal acquired by the audio acquisition section 180 is a compressed S/PDIF signal, the compressed S/PDIF signal has already acquired and processed in the communication section 120, when the corresponding PCM signal is supplied to the audio delay section 230 (see b2 in FIG. 5).

On the other hand, provided that the signal acquired by the audio acquisition section 180 is a PCM signal, the time when the audio acquisition section 180 acquires the PCM signal is identical with the time when the audio processing section 170 supplies the PCM signal to the audio delay section 230. The same applies to a case where the signal acquired by the audio acquisition section 180 is an audio signal other than the PCM signal, if the time when the audio acquisition section 180 acquires the audio signal is identical with the time when the audio processing section 170 supplies the PCM signal to the audio delay section 230.

After the audio acquisition section 180 acquires the audio stream, a sampling section 190 samples the time of the audio clock section 200 and adds a predetermined time delay1 to the sampled time, so that a stream output time is generated. The sampling section 190 adds this stream output time to the audio stream. The predetermined time delay1 is, as shown in FIG. 5, a period of time from the time when the audio acquisition section 180 acquires the audio stream to the time when the audio processing section 370 of the speaker section 310 starts the audio processing against the audio stream. In other words, the predetermined time delay1 is a period of time determined in consideration of a period during which the audio stream is supplied from the main unit section 110 to the speaker section 310, a period for re-transmission, and the like.

Therefore the stream output time is added to the acquired audio stream, and the audio stream is supplied to the communication section 120. The communication section 120 supplies the audio stream to the speaker section 310. The communication section 320 of the speaker section 310 receives the audio stream, and the speaker section 310 supplies the audio stream to the stream buffer 342.

Subsequently, the comparison section 348 compares the time of the audio clock section 346 with the stream output time of the audio stream which has temporarily been stored in the stream buffer 342. If the stream output time is equal to or later than the time indicated by the audio clock section 346, the audio stream is supplied to the audio processing section 370. The audio stream supplied to the audio processing section 370 may not include a stream output time.

In the meanwhile, the video delay section 220 and the audio delay section 230 conducts delay for a predetermined time delay2. The predetermined time delay2 is, as shown in FIG. 5, a period of time from the input of audio to the audio delay section 230 to the output of the corresponding audio from the audio processing section 370 of the speaker section 310.

As described above, after the predetermined time delay1 has passed after the time when the audio stream is acquired by the audio acquisition section 180, the audio processing section 370 of the speaker section 310 starts the processing of the audio stream. On the other hand, in the main unit section 110, the corresponding audio stream is delayed for the predetermined time delay2. As a result, lip synchronization is achieved.

The present embodiment, which can be easily implemented, is particularly suitable for a case where the resolution of a displayed image is low. When the resolution is high, a high-capacity memory is required because images stored in the video delay section 220 are uncompressed.

There is a case where the signal supplied from the audio processing section 170 to the audio delay section 230 is a compressed S/PDIF signal. In such a case, a second audio processing section for decoding the compressed S/PIDF signal must be provided on the output side of the audio delay section 230. Also in this case, the audio delay section 230 delays the audio stream for a predetermined time delay3. The predetermined time delay3 is determined in such a manner as to cause the time when the second audio processing section of the main unit section 110 outputs audio to be equal to the time when the audio processing section 370 of the speaker section 310 outputs the corresponding audio.

Embodiment 4

Figure 6:
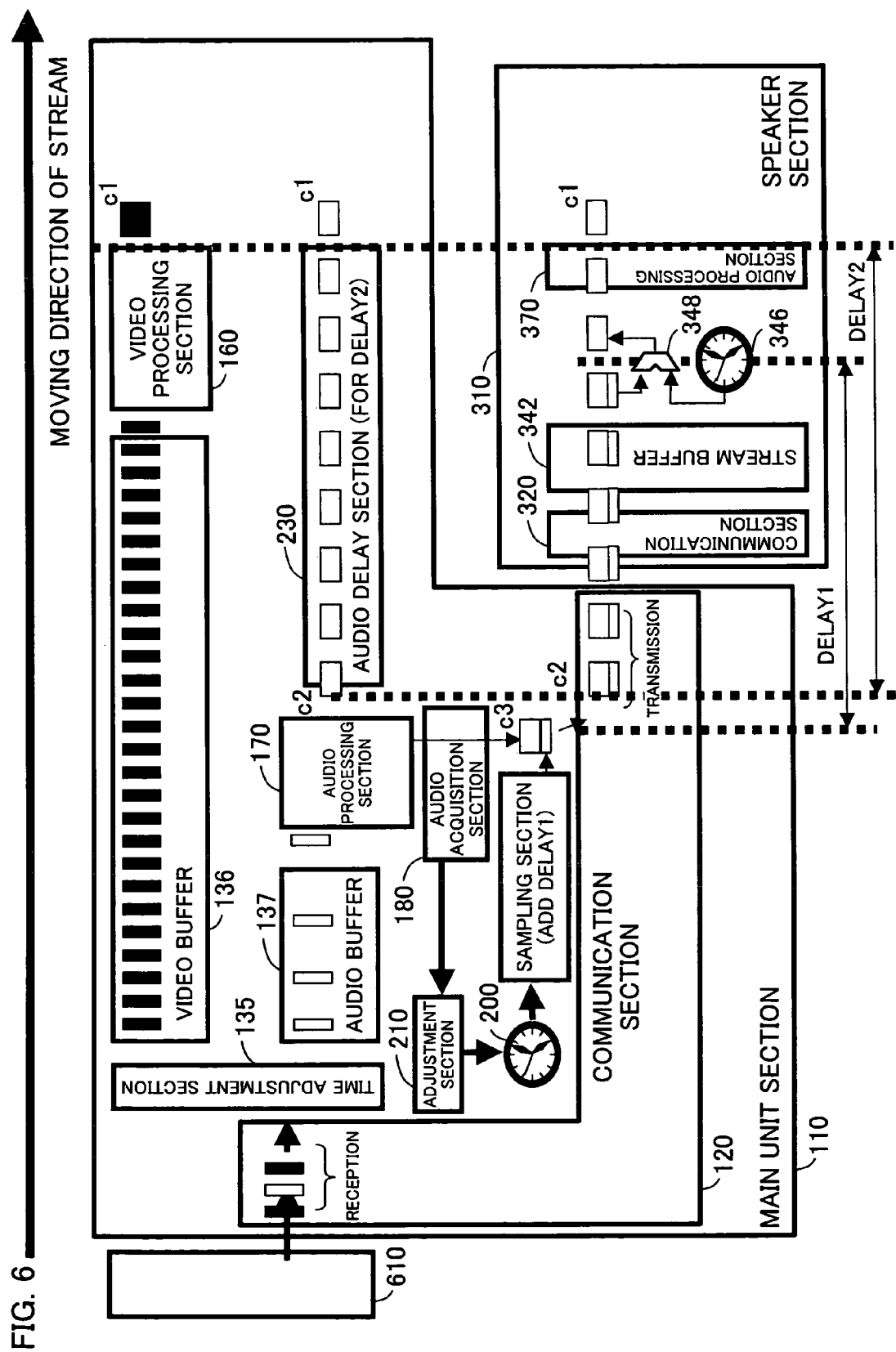
FIG. 6 is a block diagram which chronologically illustrates the flow of the AV stream supplied from an AV stream transmission device to a main unit section and a speaker section, in an AV stream transmission system of yet another embodiment of the present invention.

The following will describe yet another embodiment of the present invention in reference to FIG. 6. A home theater of the present embodiment is identical with the home theater 10 shown in FIG. 5, except that an audio acquisition section 180 acquires an audio stream from an audio processing section 170, and compressed video before being inputted to a video processing section 160 is delayed. By the way, members having the same functions as those described in Embodiments above are given the same numbers, so that the descriptions are omitted for the sake of convenience.

FIG. 6 chronologically shows the flow of an AV stream which is transmitted from an AV stream transmission device 610 to a main unit section 110 and a speaker section 310. In the figure, the horizontal axis indicates time and the moving direction of the stream. Audio and video of the AV stream are represented by black boxes and white boxes, respectively. As compared to the arrangement in FIG. 1, the stream conversion section 130 and the audio conversion section 330 are omitted in the arrangement shown in FIG. 5. These sections, however, may be provided according to need.

The main unit section 110 of the present embodiment is identical with the main unit section 110 shown in FIG. 5, except that a video display section 220 is not provided while a time adjustment section (time adjusting means) 135, a video buffer 136, and an audio buffer 137 are additionally provided upstream of the video processing section 160 and the audio processing section 170.

An AV stream includes (i) a video processing start time and/or a video display time and (ii) an audio processing start time and/or an audio output time. The video processing start time and the audio processing start time indicate when the processing of a video stream starts in the video processing section 160 and when the processing of an audio stream starts in the audio processing section 170, respectively. These times correspond to video DTS (Decoding Time Stamp) and audio DTS of MPEG2, respectively.

In the meanwhile, the video display time and the audio output time indicate when the video processing section 160 and the audio processing section 170 output video and audio, after finishing the corresponding video and audio processes. These times correspond to video PTS (Presentation Time Stamp) and audio PTS.

The time adjustment section 135 adjusts the video processing start time and the video display time for predetermined time delay2. As a result, the processing of the video stream is delayed for the predetermined time delay2. Since a video buffer 136 used for the delay stores compressed images, lip synchronization is achieved by delaying video using a relatively low-capacity memory. As shown in FIG. 6, an audio buffer 137 may be provided downstream of the time adjustment section 135.

The time adjustment section 135 is provided upstream of the video processing section 160 and the audio processing section 170.

The video buffer 136, and the audio buffer 137 may be additionally-provided buffers. Alternatively, the stream buffer 142 may function as the video buffer 136 and the audio buffer 137. A typical semiconductor chip for MPEG2 may be provided with a buffer between the demux section 150 and the video and audio processing sections 160 and 170. This buffer may be used as the video buffer 136 and the audio buffer 137.

A typical semiconductor chip for MPEG2 may include a buffer provided downstream of the audio processing section 170, which buffer is used for outputting audio in sync with the audio output time. In such a case, this buffer may be used as the audio delay section 230. In doing so, it is necessary to adjust the audio output time for the predetermined time delay2, by means of the time adjustment section 135.

The present invention is not limited to the description of the embodiments above, but may be altered by a skilled person within the scope of the claims. An embodiment based on a proper combination of technical means disclosed in different embodiments is encompassed in the technical scope of the present invention.

For example, the home theater main unit section 110 may be provided in a television 810. In this case, a speaker 820 which is not network-compatible may be provided in the television 810 or externally connected to the television 810.

The home theater main unit section 110 and the television 810 may be provided as a package. In such a case, a speaker 820 which is not network-compatible may be provided in the television 810 or externally connected to the television 810.

In Embodiments above, the home theater main unit section 110 is combined with the speaker section 310, as the home theater 10. Alternatively, these sections may be provided as different products.

The speaker section 310 and the speaker 830 may be provided in one housing. In case where there are plural speakers 830, one of the speakers 830 may be provided in a housing or the speakers 830 may be provided in respective housings.

The speaker section 310 and the speaker 830 may be provided as a package. In this case, the number of the speaker 830 may be one or more than one.

The blocks in the home theater 10, particularly the stream synchronization section 140, the audio acquisition section 180, and the audio synchronization section 340 may be realized by hardware logic. Alternatively, the blocks may be realized by software, with the use of a CPU as follows.

That is, the home theater 10 may include members such as: a CPU that executes instructions of a control program realizing the functions; a ROM recording the program; a RAM on which the program is executed; and a storage device (recording medium) such as a memory, which stores the program and various kinds of data. The objective of the present invention can be achieved in the following manner: program code (e.g. an executable code program, intermediate code program, and source program) of the control program of the home theater 10, the control program being software for realizing the functions, is recorded on a recording medium in a computer-readable manner, this recording medium is supplied to the c home theater 10, and the computer (or CPU or MPU) reads out the program code from the recording medium and execute the program.

Examples of such a recording medium include a tape, such as a magnetic tape and a cassette tape; a magnetic disk, such as a flexible disk and a hard disk; a disc including an optical disc, such as a CD-ROM/MO/MD/DVD/CD-R; a card, such as an IC card (inclusive of a memory card) and an optical card; and a semiconductor memory, such as a mask ROM, an EPROM (Erasable Programmable Read Only Memory), an EEPROM (Electrically Erasable Programmable Read Only Memory), or a flash ROM.

Alternatively, the home theater 10 may be capable of being connected to a communications network, allowing the program code to be supplied via the communications network. Non-limiting examples of the communications network include the Internet, intranet, extranet, LAN, ISDN, VAN, CATV network, virtual private network, telephone network, mobile communications network, and satellite communications network. Non-limiting examples of the transmission media composing the communications network are, wired media such as IEEE1394, USB, power line communication, cable TV lines, telephone lines, and ADSL lines, infrared light such as IrDA and remote controller, electric waves such as Bluetooth®, IEEE802.11, HDR, mobile telephone network, satellite connection, and terrestrial digital broadcasting network. It is also noted the present invention may be realized by a carrier wave or as data signal sequence, which are realized by electronic transmission of the program code.

As described above, an audio/video processing main unit of the present invention, which conducts audio processing and video processing, includes: receiving means for receiving an AV stream including video and audio, from an external device via a communication network; demux means for separating the AV stream into a video stream including the video and an audio stream including the audio; video processing means for processing the video stream so as to generate a video signal; audio acquisition means for acquiring an audio stream including at least a part of the audio, from the AV stream supplied to the receiving means; and transmitting means for transmitting the audio stream acquired by the audio acquisition means, to at least one external device via the communication network.

According to the arrangement above, an AV stream including video and audio is supplied, the supplied AV stream is separated into a video stream and an audio stream, and the separated video stream is processed so that a video signal is generated. Also, an audio stream including at least a part of the audio in the supplied AV stream is acquired and supplied to at least one external device.

In case where the device of the present invention arranged as above is used in an audio/video processing system such as a home theater, it is possible to achieve direct interoperability with typical network AV devices transmitting AV streams, and improve the bandwidth efficiency by reducing the number of transmissions of video and audio as compared to conventional arrangements.

For example, in the case of an HDTV AV stream of 20 Mbps, the rate of a DTS (Digital Theater System) audio stream in compliant with 5.1 channels is 1536 Kbps at the maximum, whereas the rate of a video stream is about 18.5 Mbps. The bandwidth in the present invention is therefore restrained to about 21.5 Mbps. This bandwidth can be achieved by a wireless LAN (WLAN) module compliant with IEEE802.11a. In the case of a 5.1 channel audio stream with another format, the maximum transmission rate is 448 kbps in DolbyDigital, and is 912 kbps in AAC (Advanced Audio Coding). Therefore, an audio stream with another format cal also be transmitted by a wireless LAN module.

According to the arrangement above, an audio stream acquired by the audio acquisition means is transmitted, by the transmitting means, to at least one external device via a communication network. It is therefore possible to flexibly change the configuration and arrangement of the audio/video processing main unit and external devices.

Now, the following will specifically describe a home theater main unit as an example of the audio/video processing main unit and a communication device for a speaker, as an example of the external device. For example, there are two methods to transmit, over a network, an audio stream only to two rear speakers.

According to one method, in case where two rear speakers are not distant from each other, the audio stream acquired by the audio acquisition means is supplied to one communication device for the speaker, and two rear speakers are connected to the communication device. In this case, the communication device can be provided away from the home theater main unit, while the rear speakers can be provided near the communication device. This makes it possible to simplify the lines between the home theater main unit and the communication device for the speakers.

According to the other method, in case where two rear speakers are distant from each other, the audio stream acquired by the audio acquisition means is supplied to two communication devices for speakers. In this case, these two communication devices can be provided in two speakers, respectively. This makes it possible to simplify the lines between the home theater main unit and two speakers. The same applies to a case where the number of the speakers is more than two.

The audio/video processing main unit of the present invention may further include: audio clock means for indicating a time for determining a timing to output the audio; and adjusting means for adjusting the audio clock means in such a manner as to cause the audio clock means to be in synchronization with the audio stream acquired by the audio acquisition means.

According to the arrangement above, the audio clock means is synchronized with the acquired audio stream. On this account, it is possible to achieve lip synchronization between the audio/video processing main unit such as a home theater main unit and the external device such as a speaker to which the acquired audio stream is transmitted, and meet the requirement for the skews of sounds between speakers.

The audio/video processing main unit of the present invention may further include sampling means for sampling the time indicated by the audio clock means, the transmitting means transmitting the time sampled by the sampling means, to said at least one external device via the communication network.

According to the arrangement above, the time indicated by the audio clock means is sampled and the information of the sampled time is supplied to at least one external device. On this account, the audio clock means provided for determining the timing to output audio from the external device such as a speaker is adjusted in accordance with the sampled time, and hence the synchronization with the audio clock means of the audio/video processing main unit such as a home theater main unit is precisely achieved. In an example, the synchronization was achieved in the order of 100 ns. This precision of the synchronization is one digit higher than the requirements (1-10 μs) for the lip synchronization and the skew of sounds between speakers. It is therefore possible to realize synchronization which is more precise than the requirements.

The audio/video processing main unit of the present invention may further include: a stream buffer which temporarily stores the AV stream supplied to the receiving means; AV clock means for indicating a time for determining a timing to output the AV stream; adjusting means for adjusting the AV clock means in such a manner as to cause the AV clock means to be in synchronization with the AV stream; and comparing means for supplying at least a part of the Av stream to the demux means, in case where the AV stream output time of the AV stream is equal to or later than the time indicated by the AV clock means, the AV stream including information of a stream output time.

According to the arrangement above, at least a part of the AV stream is supplied to the demux means, in reference to the stream output time. By doing so, the synchronization precision required in MPEG2-TS is achieved. Good synchronization precision is achieved because, the clock means of a typical MPEG2 decoder must be synchronized with an MPEG2 stream. Since an MPEG2-TS signal supplied to the MPEG2 decoder is synchronized by the method above, the synchronization of the clock means in the MPEG2 decoder is highly precise. In other words, the clock means in the MPEG 2 decoder is synchronized twice.

The audio/video processing main unit of the present invention may be arranged such that the receiving means also receives information of a clock adjusting time which is in synchronization with the supplied AV stream, and the adjusting means adjusts the Av clock means in reference to the clock adjusting time.

According to the arrangement above, since the AV clock means is adjusted using the clock adjusting time synchronized with the AV stream, it is possible to achieve they synchronization precision which meets or higher than the precision required in MPEG2-TS.

The audio/video processing main unit of the present invention may be arranged such that the audio acquisition means acquires the audio stream including at least a part of the audio from the AV stream, after the receiving means transmits the AV stream and before the stream buffer receives the AV stream. Also, the audio stream acquired by the audio acquisition means may include the information of the AV stream output time.

According to the arrangement above, the audio stream including the information of the stream output time can be supplied from the audio/video processing main unit such as a home theater main unit to the external device such as a speaker. On this account, the audio clock means of the external device is adjusted in reference to the stream output time, and is synchronized with the audio clock means of the audio/video processing main unit. Since the audio/video processing main unit and the external device conduct the video processing and the audio processing in reference to the stream output time, it is possible to easily achieve the lip synchronization.

The audio/video processing main unit of the present invention may further include sampling means for sampling the time indicated by the AV clock means, the transmitting means transmitting information of the time sampled by the sampling means, to said at least one external device via the communication network.

According to the arrangement above, the AV clock means of the audio/video processing main unit can be integrated with they audio clock means. It is therefore possible to simplify the architecture of the audio/video processing main unit.

The audio/video processing main unit of the present invention may further include audio processing means for processing the audio stream so as to generate an audio signal.

According to the arrangement above, the separated audio stream is processed so that an audio signal is further generated. Therefore, in the audio/video processing main unit of the present invention, an audio signal can be generated in addition to a video signal.

The audio acquisition means acquires an audio stream including at least a part of the audio in the AV stream, after the receiving means transmits the AV stream and before the audio processing means transmits the audio signal.

The audio/video processing main unit of the present invention may be arranged such that the audio acquisition means acquires, from the audio processing means, an audio stream including at least a part of the audio.

The video processing means and the audio processing means are typically parts of a single semiconductor chip, and the semiconductor chip outputs an audio signal. Therefore, according to the arrangement above, the audio acquisition means acquires an audio signal supplied from the audio processing means, and transmits this signal as an audio stream. This makes it easily to acquire audio.

The audio/video processing main unit of the present invention may further include audio delay means for delaying the audio signal supplied from the audio processing means. Also, the audio/video processing main unit of the present invention may further include video delay means for delaying the video signal supplied from the video processing means.

The audio stream acquired by the audio acquisition means have been processed by the audio processing means. This audio stream is further processed in the audio processing means of the external device, after being transmitted from the audio/video processing main unit to the external device. On this account, the audio and video from the audio/video processing main unit are out of sync with the audio from the external device, by the time for the network transmission and the time for the audio processing in the external device.

In consideration of the above, the audio and video from the audio/video processing main unit are delayed by the audio delay means and the video delay means, in the arrangement above. With this, the video and audio from the audio/video processing main unit are synchronized with the audio from the external device. It is therefore possible to meet the requirement for the lip synchronization between the audio/video processing main unit and the external device.

The audio/video processing main unit of the present invention may further include time adjusting means for adjusting at least one of a video processing start time, a video display time, an audio processing start time, and an audio output time, at least one of which is included in the AV stream.

The video supplied from the video processing means is uncompressed. On this account, the memory capacity required by the video delay means may be enormous, depending on the resolution and the frame rate of the video. According to the arrangement above, the video processing start time or the video display time of the AV stream is adjusted and delayed. Since the AV stream is a compressed stream, it is possible to restrain the memory capacity required by the video delay means. The lip synchronization requirement is therefore satisfied by a simple architecture. The same applies to the audio.

The audio/video processing main unit of the present invention may further include audio clock means for indicating a time for determining a timing to output the audio; and adjusting means for adjusting the clock means in such a manner as to cause the clock means to be in synchronization with the audio stream acquired by the audio acquisition means.

The demux means, the video processing means, and the audio processing means are included as the processes of MPEG2-TS. Also, an AV stream supplied to the demux means is required to be in synchronization within 500 ns. On the other hand, decoded MPEG2-TS video after the video processing and the audio processing is in synchronization within 2 ns, and the audio is in synchronization to the same extent. Therefore, the synchronization of the stream supplied to MPEG2-TS is reduced from the range of 500 ns to about 2 ns. On this account, particularly when the acquired audio stream is in compliant with PCM or SPDIF, the stream is highly precisely synchronized.

In the meanwhile, the AV clock means and the audio clock means are synchronized at 500 ns. On this account, in case where the AV clock means and the audio clock means are combined, the synchronization precision between the audio clock means and the audio stream acquired by the audio acquisition means is low, i.e. about 500 ns.

According to the arrangement above, since the AV clock means is different from the audio clock means, the audio clock means can be synchronized with the acquired audio stream, with higher precision. Moreover, since the audio clock means is adjusted so as to be synchronized with the audio stream acquired by the audio acquisition means, it is possible to synchronize the audio clock means with higher precision.

The audio/video processing main unit of the present invention may further include acquisition sampling means for sampling the time indicated by the audio clock means, when the audio acquisition means acquires the audio stream, the acquisition sampling means adding a maximum audio transmission time to the sampled time so as to generate a stream output time, and the transmitting means transmitting the audio stream including information of the stream output time, to said at least one external device via the communication network.

According to the arrangement above, it is possible to surely synchronize the video and audio from the audio/video processing main unit with the audio from the external device.

The audio/video processing main unit of the present invention may be arranged such that the audio stream acquired by the audio acquisition means is a continuous bit stream with a fixed bit rate, the continuous bit stream including a synchronization header used for achieving synchronization, and the adjusting means adjusts the audio clock means, in reference to the synchronization header.

According to the arrangement above, in case where, for example, a synchronization header (Preamble) for synchronizing an S/PDIF (Sony/Philips Digital Interface Format) signal is included as in the case of S/PDIF, the audio clock means is easily synchronized with the audio stream (S/PDIF).

As described above, an audio processing main unit of the present invention, which conducts audio processing and transmits an audio stream, includes: obtaining means for acquiring an audio stream including at least audio; audio processing means for subjecting the acquired audio stream to the audio processing, so as to output an audio signal; audio acquisition means for acquiring, from the acquired audio stream, an audio stream including at least a part of the audio; audio clock means for indicating a time for determining a timing to output the audio; adjusting means for adjusting the audio clock means in such a manner as to cause the audio clock means to be in synchronization with the audio stream acquired by the audio acquisition means; sampling means for sampling the time indicated by the audio clock means; and transmitting means for transmitting the audio stream acquired by the audio acquisition means and information of the time sampled by the sampling means, to at least one external device via a communication network.

According to the arrangement above, an audio stream including at least audio is acquired and an audio signal is generated by processing the acquired audio stream, whereas the audio stream acquired by the audio acquisition means is supplied, by the transmitting means, to at least one external device via a communication network. On this account, as with the case above, it is possible to flexibly change the configuration and arrangement of the audio processing main unit and external devices.

Also, since the audio clock means is in synchronization with the acquired audio stream, it is possible to meet the requirement for the skew of sounds between the audio processing main unit and the external devices.

Furthermore, the time indicated by the audio clock means is sampled and the information of the sampled time is supplied to at least one external device. On this account, the audio clock means provided for determining the timing to output audio from the external device is adjusted in reference to the sampled time, and hence the synchronization with the audio clock means of the audio processing main unit is precisely achieved. As a result, it is possible to realize synchronization more precise than the requirement.

The transmitting means may transmit the audio stream acquired by the audio acquisition means and the information of the time sampled by the sampling means altogether, or may transmit the audio stream and the sampled time separately.

As described above, an audio processing terminal device of the present invention includes: receiving means for receiving an audio stream including audio, from an external device via a communication network; audio processing means for processing the audio stream so as to generate an audio signal; audio clock means for indicating a time for determining a timing to output the audio; and adjusting means for adjusting the audio clock means in such a manner as to cause the audio clock means to be in synchronization with the audio stream.

According to the arrangement above, an audio stream including audio is supplied and an audio signal is generated by processing the supplied audio stream, whereas the timing to output audio is determined using the audio clock means synchronized with the supplied audio stream. This makes it possible to meet the requirement for the skews of sounds among the external devices (audio/video processing main unit, audio processing main unit) and the audio processing terminal device. Moreover, by the arrangement above, it is possible to construct a network speaker which is in compliant with a network home theater which can deal with an AV stream supplied from a typical network AV device.

The audio processing terminal device of the present invention may be arranged such that the receiving means receives information of a timing at which the external device outputs audio corresponding to the supplied audio stream, and the adjusting means adjusts the audio clock means, in reference to the information of the timing.

According to the arrangement above, information about a timing to output, form the external device, audio corresponding to the supplied audio stream is supplied, and the audio clock means is adjusted in reference to this information of the timing. On this account, synchronization with the audio clock means of the audio processing main unit is precisely achieved. As a result, it is possible to realize synchronization more precise than the above-described requirement.

The audio processing terminal device of the present invention may be arranged such that the receiving means receives information of a clock adjusting time synchronized with the supplied audio stream, and the adjusting means adjusts the audio clock means in reference to the clock adjusting time.

According to the arrangement above, the information of the clock adjusting time synchronized with the supplied audio stream is supplied, and the audio clock means is adjusted in reference to the clock adjusting time. On this account, synchronization with the audio clock means of the audio processing main unit is precisely achieved. As a result, it is possible to realize synchronization more precise than the above-described requirement.

The audio processing terminal device of the present invention may include: a stream buffer which temporarily stores the audio stream supplied to the receiving means; and comparing means for transmitting at least a part of the audio stream to the audio processing means, when the stream output time of the audio stream is equal to or later than the time indicated by the audio clock means, the audio stream including information of a stream output time.

According to the arrangement above, the audio stream is supplied to the audio processing means in reference to the stream output time. On this account, the synchronization precision required in MPEG2-TS is achieved, as described above.

Effects similar to the above can be achieved by an audio/video processing system including the above-described audio/video processing main unit and the above-described audio processing terminal device which receives an audio stream from the above-described audio/video processing main unit via a communication network.

As described above, a control method of an audio/video processing main unit of the present invention, which conducts video processing and audio processing, includes the steps of: receiving an AV stream including video and audio, from an external device via a communication network; acquiring, from the supplied AV stream, an audio stream including at least a part of the audio; and transmitting the acquired audio stream to at least one external device, via the communication network.

According to the method above, an AV stream including video and audio is supplied, an audio stream including at least a part of the audio included in the supplied AV stream is acquired, and the acquired audio stream is supplied to at least one external device.

In case where the method of the present invention arranged as above is used in an audio/video processing system such as a home theater, it is possible to achieve direct interoperability with typical network AV devices transmitting AV streams, and improve the bandwidth efficiency by reducing the number of transmissions of video and audio as compared to conventional arrangements. Furthermore, since the acquired audio stream is supplied to at least one external device via a communication network, it is possible to flexibly change the configuration and arrangement of the audio/video processing main unit and the external devices.

As described above, a control method of an audio processing terminal device of the present invention, which conducts audio processing and includes audio clock means for indicating a time for determining a timing to output audio, includes the steps of: receiving an audio stream including the audio, from an external device via a communication network; adjusting the audio clock means in such a manner as to cause the audio clock means to be in synchronization with the audio stream; and processing the audio stream in reference to the time indicated by the adjusted audio clock means, so as to generate an audio signal.

According to the arrangement above, an audio stream including audio is supplied and an audio signal is generated by processing the supplied audio stream, whereas the timing to output the audio is determined using the audio clock means which is in synchronization with the supplied audio stream. This makes it possible to meet the requirement for the skews of sounds among the external devices (audio/video processing main unit, audio processing main unit) and the audio processing terminal device.

The means of the above-described audio/video processing main unit can be realized on a computer by an audio/video processing main unit control program. Also, the means of the above-described audio processing terminal device can be realized on a computer by an audio processing terminal device control program.

The audio/video processing main unit control program and/or the audio processing terminal device control program is stored in a computer-readable storage medium. This makes it possible to execute the audio/video processing main unit control program and/or the audio processing terminal device control program on any computers.

As described above, the audio/video processing main unit of the present invention can be used not only for any information communication devices which have video display capability and audio output capability, such as a main unit section of a home theater but also for a mobile phone, PDA, note PC, desktop PC, network-compatible display device, and network-compatible home electric appliance. Moreover, the audio processing terminal device of the present invention can be used not only for a speaker section of a home theater but also for any information communication devices which have audio output capability.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An audio/video processing main unit which conducts audio processing and video processing,
   the audio/video processing main unit comprising:
   a receiving unit receiving an AV stream including video and audio, from an external device via a communication network;
   a demux unit separating the AV stream into a video stream including the video and an audio stream including the audio;
   a video processing unit processing the video stream so as to generate a video signal;
   an audio acquisition unit acquiring an audio stream including at least a part of the audio, from the AV stream supplied to the receiving unit;
   a transmitting for unit transmitting the audio stream acquired by the audio acquisition unit, to at least one external device via the communication network;
   a stream buffer which temporarily stores the AV stream supplied to the receiving unit;
   an AV clock unit indicating a time for determining a timing to output the AV stream;
   an AV clock adjusting unit adjusting the AV clock unit in such a manner as to cause the AV clock unit to be in synchronization with the AV stream; and
   a comparing unit supplying at least a part of the AV stream to the demux unit, in case where an AV stream output time of the AV stream is equal to or later than the time indicated by the AV clock unit,
   the AV stream including information of the AV stream output time.

2. The audio/video processing main unit as defined in claim 1,
   wherein, the receiving unit also receives information of a clock adjusting time which is in synchronization with the supplied AV stream, and
   the AV clock adjusting unit adjusts the AV clock unit in reference to the clock adjusting time.

3. The audio/video processing main unit as defined in claim 1,
   wherein, the audio acquisition unit acquires the audio stream including at least a part of the audio from the AV stream, after the receiving unit transmits the AV stream and before the stream buffer receives the AV stream.

4. The audio/video processing main unit as defined in claim 3,
   wherein, the audio stream acquired by the audio acquisition unit includes the information of the AV stream output time.

5. The audio/video processing main unit as defined in claim 3, further comprising a sampling unit sampling the time indicated by the AV clock unit,
   the transmitting unit transmitting information of the time sampled by the sampling unit, to said at least one external device via the communication network.

6. The audio/video processing main unit as defined in claim 1, further comprising:
   an audio clock unit indicating a time for determining a timing to output the audio; and
   a sampling unit sampling the time indicated by the audio clock unit,
   the transmitting unit transmitting information of the time sampled by the sampling unit, to said at last one external device via the communication network.

7. The audio/video processing main unit as defined in claim 6, further comprising:
   an audio clock adjusting unit adjusting the audio clock unit in such a manner as to cause the audio clock unit to be in synchronization with the audio stream acquired by the audio acquisition unit.

8. The audio/video processing main unit as defined in claim 6, further comprising an audio processing unit processing the audio stream so as to generate an audio signal.

9. The audio/video processing main unit as defined in claim 8,
   wherein, the audio acquisition unit acquires, from the audio processing unit, an audio stream including at least a part of the audio.

10. The audio/video processing main unit as defined in claim 9, further comprising an audio delay unit delaying the audio signal supplied from the audio processing unit.

11. The audio/video processing main unit as defined in claim 9, further comprising a video delay unit delaying the video signal supplied from the video processing unit.

12. The audio/video processing main unit as defined in claim 9, further comprising a time adjusting unit adjusting at least one of a video processing start time, a video display time, an audio processing start time, and an audio output time, at least one of which is included in the AV stream.

13. The audio/video processing main unit as defined in claim 9, further comprising an acquisition sampling unit sampling the time indicated by the audio clock unit, when the audio acquisition unit acquires the audio stream,
the acquisition sampling unit adding a maximum audio transmission time to the sampled time so as to generate an audio stream output time, and
the transmitting unit transmitting the audio stream including information of the audio stream output time, to said at least one external device via the communication network.

14. The audio/video processing main unit as defined in claim 9, further comprising:
an audio clock adjusting unit adjusting the audio clock unit in such a manner as to cause the audio clock unit to be in synchronization with the audio stream acquired by the audio acquisition unit,
the audio stream acquired by the audio acquisition unit being a continuous bit stream with a fixed bit rate, the audio stream including a synchronization header used for achieving synchronization, and
the audio clock adjusting unit adjusting the audio clock unit, in reference to the synchronization header.

15. An audio processing main unit which conducts audio processing and transmits an audio stream, comprising:
an obtaining unit acquiring an audio stream including at least audio;
an audio processing unit subjecting the acquired audio stream to the audio processing, so as to output an audio signal;
an audio acquisition unit acquiring, from the acquired audio stream, an audio stream including at least a part of the audio;
an audio clock unit indicating a time for determining a timing to output the audio;
a sampling unit sampling the time indicated by the audio clock unit;
a transmitting unit transmitting the audio stream acquired by the audio acquisition unit and information of the time sampled by the sampling unit, to at least one external device via a communication network;
a stream buffer which temporarily stores the audio stream acquired by the obtaining unit;
an audio clock adjusting unit adjusting the audio clock unit in such a manner as to cause the audio clock unit to be in synchronization with the audio stream acquired by the obtaining unit; and
a comparing unit for transmitting at least a part of the audio stream acquired by the obtaining unit to the audio processing unit, when an audio stream output time of the audio stream acquired by the obtaining unit is equal to or later than the time indicated by the audio clock unit,
the audio stream acquired by the obtaining unit including information of the audio stream output time.

16. An audio processing terminal device, comprising:
a receiving unit receiving an audio stream including audio, from an external device via a communication network;
an audio processing unit processing the audio stream so as to generate an audio signal;
an audio clock unit indicating a time for determining a timing to output the audio;
an audio clock adjusting unit adjusting the audio clock unit in such a manner as to cause the audio clock unit to be in synchronization with the audio stream;
a stream buffer which temporarily stores the audio stream supplied to the receiving unit; and
a comparing unit for transmitting at least a part of the audio stream to the audio processing unit, when an audio stream output time of the audio stream is equal to or later than the time indicated by the audio clock unit,
the audio stream including information of the audio stream output time.

17. The audio processing terminal device as defined in claim 16,
wherein, the receiving unit receives information of a timing at which the external device outputs audio corresponding to the supplied audio stream, and
the adjusting unit adjusts the audio clock unit, in reference to the information of the timing.

18. The audio processing terminal device as defined in claim 16,
wherein, the receiving unit receives information of a clock adjusting time synchronized with the supplied audio stream, and
the adjusting unit adjusts the audio clock unit in reference to the clock adjusting time.

19. An audio/video processing system in which an audio/video processing main unit conducting video processing and audio processing is connected, by a communication network, to at least one audio processing terminal device conducting audio processing,
the audio/video processing main unit including:
a receiving unit receiving an AV stream including video and audio from an external device via a communication network;
a demux unit separating the AV stream into a video stream including the video and an audio stream including the audio;
a video processing unit processing the video stream so as to generate a video signal;
an audio acquisition unit acquiring an audio stream including at least a part of the audio, from the AV stream supplied to the receiving unit;
a transmitting unit transmitting the audio stream acquired by the audio acquisition unit, to said at least one audio processing terminal device via the communication network;
a stream buffer which temporarily stores the AV stream supplied to the receiving unit;
an AV clock unit indicating a time for determining a timing to output the AV stream;
an AV clock adjusting unit adjusting the AV clock unit in such a manner as to cause the AV clock unit to be in synchronization with the AV stream; and
a comparing unit supplying at least a part of the AV stream to the demux unit, in case where an AV stream output time of the AV stream is equal to or later than the time indicated by the AV clock unit,
the AV stream including information of the AV stream output time,
said at least one audio processing terminal device including:
a receiving unit receiving the audio stream from the audio/video processing main unit via the communication network;
an audio processing unit processing the audio stream so as to generate an audio signal;
an audio clock unit indicating a time for determining a timing to output the audio;

an audio clock adjusting unit adjusting the audio clock unit in such a manner as to cause the audio clock unit to be in synchronization with the audio stream;

a stream buffer which temporarily stores the audio stream supplied to the receiving unit; and a comparing unit for transmitting at least a part of the audio stream to the audio processing unit, when an audio stream output time of the audio stream is equal to or later than the time indicated by the audio clock unit, the audio stream including information of the audio stream output time.

20. A control method of an audio/video processing main unit which conducts video processing and audio processing, comprising the steps of:

(i) receiving an AV stream including video and audio, from an external device via a communication network;

(ii) acquiring, from the supplied AV stream, an audio stream including at least a part of the audio;

(iii) transmitting the acquired audio stream to at least one external device, via the communication network;

(iv) temporarily storing the received AV stream;

(v) adjusting an AV clock unit in such a manner as to cause the AV clock unit to be in synchronization with the audio stream, the AV clock unit indicating a time for determining a timing to output the AV stream;

(vi) separating at least a part of the AV stream into a video stream including the video and an audio stream including the audio, when an AV stream output time of the AV stream is equal to or later than the time indicated by the AV clock unit;

(vii) processing the video stream so as to generate a video signal, (viii) the AV stream including information of the AV stream output time.

21. The control method, as defined in claim 20, further comprising the step of:

(ix) sampling a time indicated by an audio clock unit for determining a timing to output the audio, the audio stream acquired in step (ii) and information of the time sampled in the step (ix) being transmitted in the step (iii).

22. A control method of an audio processing terminal device which conducts audio processing and includes an audio clock unit for indicating a time for determining a timing to output audio, the method comprising the steps of:

receiving an audio stream including the audio, from an external device via a communication network;

temporarily storing the received audio stream;

adjusting the audio clock unit in such a manner as to cause the audio clock unit to be in synchronization with the audio stream;

processing at least a part of the audio stream so as to generate an audio signal, when an audio stream output time of the audio stream is equal to or later than the time indicated by the adjusted audio clock unit, the audio stream including information of the audio stream output time.

23. A non-transitory computer-readable storage medium storing an audio/video processing main unit control program for operating an audio/video processing main unit which conducts video processing and audio processing, the audio/video processing main unit including:

a receiving unit receiving an AV stream including video and audio from an external device via a communication network;

a demux unit separating the AV stream into a video stream including the video and an audio stream including the audio;

a video processing unit processing the video stream so as to generate a video signal;

an audio acquisition unit acquiring an audio stream including at least a part of the audio, from the AV stream supplied to the receiving unit; and a transmitting unit transmitting the audio stream acquired by the audio acquisition unit, to at least one external device via the communication network;

a stream buffer which temporarily stores the AV stream supplied to the receiving unit;

an AV clock unit indicating a time for determining a timing to output the AV stream;

an AV clock adjusting unit adjusting the AV clock unit in such a manner as to cause the AV clock unit to be in synchronization with the AV stream; and a comparing unit supplying at least a part of the AV stream to the demux unit, in case where an AV stream output time of the AV stream is equal to or later than the time indicated by the AV clock unit, the AV stream including information of the AV stream output time, and the program causing a computer to function as the units of the audio/video processing main unit.

24. The non-transitory computer-readable storage medium as defined in claim 23, wherein the audio/video processing main unit further includes:

an audio clock unit indicating a time for determining a timing to output the audio; and a sampling unit sampling the time indicated by the audio clock unit, the transmitting unit transmitting information of the time sampled by the sampling unit, to said at least one external device via the communication network.

25. A non-transitory computer-readable storage medium which stores an audio processing terminal device control program for operating an audio processing terminal device which conducts audio processing, the audio processing terminal device including:

a receiving unit receiving an audio stream including audio, from an external device via a communication network;

an audio processing unit processing the audio stream so as to generate an audio signal;

an audio clock unit indicating a time for determining a timing to output the audio; and an audio clock adjusting unit adjusting the audio clock unit in such a manner as to cause the audio clock unit to be in synchronization with the audio stream, a stream buffer which temporarily stores the audio stream supplied to the receiving unit;

a comparing unit for transmitting at least a part of the audio stream to the audio processing unit, when an audio stream output time of the audio stream is equal to or later than the time indicated by the audio clock unit, the audio stream including information of the audio stream output time, and the program causing a computer to function as the units of the audio processing terminal device.

* * * * *